(12) United States Patent
Arnold et al.

(10) Patent No.: US 7,573,400 B2
(45) Date of Patent: Aug. 11, 2009

(54) SYSTEMS AND METHODS FOR CONFIGURING INTERSECTION DETECTION ZONES

(75) Inventors: David V. Arnold, Provo, UT (US); Bradley C. Giles, American Fork, UT (US); Logan C. Harris, Orem, UT (US); Bryan R. Jarrett, Pleasant Grove, UT (US); Thomas W. Karlinsey, Orem, UT (US); Jonathan L. Waite, Orem, UT (US)

(73) Assignee: Wavetronix, LLC, Lindon, UT (US)

( * ) Notice: Subject to any disclaimer, the term of this patent is extended or adjusted under 35 U.S.C. 154(b) by 827 days.

(21) Appl. No.: 11/264,339

(22) Filed: Oct. 31, 2005

(65) Prior Publication Data
US 2007/0096943 A1  May 3, 2007

(51) Int. Cl.
G08B 1/00 (2006.01)
(52) U.S. Cl. .............. 340/907; 340/909; 340/910; 340/916; 340/917; 340/933; 340/935; 340/937
(58) Field of Classification Search ............ 340/907, 340/909, 910, 911, 912, 916, 917, 924, 933, 340/935, 937
See application file for complete search history.

(56) References Cited

U.S. PATENT DOCUMENTS

| | | | |
|---|---|---|---|
| 3,737,857 A * | 6/1973 | Carman | 367/197 |
| 4,053,741 A * | 10/1977 | Ainoya et al. | 700/113 |
| 4,908,615 A | 3/1990 | Bayraktaroglu | |
| 5,243,528 A * | 9/1993 | Lefebvre | 701/211 |
| 5,339,081 A | 8/1994 | Jefferis et al. | |
| 5,621,645 A | 4/1997 | Brady | |
| 5,663,720 A | 9/1997 | Weissman | |
| 5,716,301 A * | 2/1998 | Wild et al. | 477/97 |
| 5,793,491 A | 8/1998 | Wangler et al. | |
| 5,798,983 A | 8/1998 | Kuhn et al. | |
| 6,011,515 A | 1/2000 | Radcliffe et al. | |
| 6,114,973 A | 9/2000 | Winner et al. | |
| 6,124,807 A | 9/2000 | Heckeroth et al. | |
| 6,195,608 B1 | 2/2001 | Berliner et al. | |

(Continued)

FOREIGN PATENT DOCUMENTS

GB    1443701    7/1976

OTHER PUBLICATIONS

SmarTek Acoustic Sensor—Version 1 (SAS-1) Installation and Setup Guide; Apr. 3, 2003.

(Continued)

*Primary Examiner*—Daryl Pope
(74) *Attorney, Agent, or Firm*—Workman Nydegger

(57) ABSTRACT

The present invention extends to configuring detection zones in a traffic monitoring system and to association of detection zones with corresponding traffic signal phases. One or more sensors detect targets within a roadway intersection. The sensors integrate acquired sensor data for the targets into track files. The track files are subsequently used to identify common target paths. A histogram is used to identify common target positions for stationary targets. From the common target positions and the common target paths detection zones are configured. Detection zones are associated with traffic signal phases so that specific detections can be created. Lane boundaries within the roadway intersection are inferred from the common target paths. Permanent stationary target locations are identified from the common target positions.

52 Claims, 14 Drawing Sheets

U.S. PATENT DOCUMENTS

| | | | |
|---|---|---|---|
| 6,556,916 | B2 | 4/2003 | Waite et al. |
| 6,693,557 | B2 | 2/2004 | Arnold et al. |
| 6,707,391 | B1 | 3/2004 | Monroe |
| 6,781,523 | B2 | 8/2004 | Matsui et al. |
| 6,879,281 | B2 | 4/2005 | Gresham et al. |
| 6,888,474 | B2 | 5/2005 | Sharp et al. |
| 7,324,015 | B1 * | 1/2008 | Allen et al. .................. 340/933 |
| 2004/0083037 | A1 | 4/2004 | Yamane et al. |
| 2004/0119633 | A1 | 6/2004 | Oswald et al. |
| 2004/0174294 | A1 | 9/2004 | Arnold et al. |
| 2005/0046597 | A1 | 3/2005 | Hutchison et al. |
| 2005/0231384 | A1 | 10/2005 | Shimotani |

OTHER PUBLICATIONS

University Research in Support of the Department of Transportation Program on Remote Sensing Applications in Transportation (DTRS56-00-BAA-0004) Nov. 1999.

Cambridge Consultants; Technology at the crossroads: new radar sensor allows pedestrians and traffic to coexist; Feb. 24, 2004.

Computer Vision Algorithms for Intersection Monitoring; Harini Veeraraghavan, Osama Masoud, and Nikolaos P. Papanikolopoulous, Senior Member, IEEE IEEE Transactions on Intelligent Transportation Systems, vol. 4, No. 2, Jun. 2003.

SmartSensor Installation Guide WaveTronix Copyright 2004 pp. 1-26.

Autoscope Clearing the Congestion: Vision Makes Traffic Control Intelligent Brian Carlson Published in Advanced Imaging, Feb. 1997 5 pgs.

Econolite Control Products, Inc. Autoscope Automates 100% of Video Detection Set-Up: Introducing the Autoscope Wizard Nov. 1, 2003 2 pgs.

Autoscope Solo Pro II Machine Vision Processor Econolite Control Products, Inc. 2003 2 pgs.

Adaptive Lane Finding in Road Traffic Image Analysis B.D. Stewart, I. Reading, M.S. Thomson, T.D. Binnie, K W. Dickinson, C.L. Wan Napier University, Edinburgh, UK Road Traffic Monitoring and Control, Apr. 26-28, 1994 Conference Publication No. 391, IEE, 1994 pp. 133-136.

Red Light Hold Radar-based system prevents collisions from red light runners Optisoft The Intelligent Traffic Signal Platform 2 pgs.

Transportation Sensors Optional features for the OptiSoft ITS Platform Optisoft The Intelligent Traffic Signal Platform 1 pg.

Transportation Systems Railway Grade Crossing Sensor Aug. 17, 2004 1 pg.

Transportation Systems Millimeter Wave Radar Traffic Sensor AutoTrak Aug. 17, 2004 2 pgs.

Sensor Technologies & Systems, Inc. AutoTrak Intelligent Transportation Systems/Advanced Traffic Management Systems Aug. 17, 2004 2 pgs.

Image Sensor for Measuring Volumes by Direction Atsushi Saito International Sales & Marketing Department Social Systems Solution & Service Business Company OMRON Corporation, Tokyo Japan ITS World Congress Oct. 2004 1 pg.

Computer Vision Algorithms for Intersection Monitoring; Harini Veeraraghavan, Osama Masoud, and Nikolaos P. Papanikolopoulous, Senior Member, IEEE IEEE Transactions on Intelligent Transportation Systems vol. 4, No. 2, Jun. 2003.

* cited by examiner

|      | 24S    | 24R    | 24Q    | 24P    | 24O    | 24N    | 24M    |
|------|--------|--------|--------|--------|--------|--------|--------|
| 124A | -43 dB | -66 dB | -58 dB | -38 dB | -41 dB | -45 dB | -42 dB |
| 124B | -42 dB | -72 dB | -61 dB | -20 dB | -53 dB | -40 dB | -57 dB |
| 124C | -45 dB | -58 dB | -38 dB | -25 dB | -38 dB | -43 dB | -53 dB |
| 124D | -23 dB | -40 dB | -20 dB | 0 dB   | -22 dB | -30 dB | -20 dB |
| 124E | -57 dB | -61 dB | -40 dB | -23 dB | -39 dB | -60 dB | -58 dB |
| 124F | -53 dB | -45 dB | -71 dB | -25 dB | -53 dB | -43 dB | -71 dB |
| 124G | -41 dB | -72 dB | -61 dB | -40 dB | -43 dB | -41 dB | -66 dB |

Fig. 12

SYSTEMS AND METHODS FOR CONFIGURING INTERSECTION DETECTION ZONES

CROSS-REFERENCE TO RELATED APPLICATIONS

Not applicable.

BACKGROUND OF THE INVENTION

1. The Field of the Invention

The present invention relates to roadway sensors and, more particularly, to configuring intersection detection zones.

2. The Relevant Technology

The use of traffic sensors for the actuation of traffic signal lights located at the intersection of roadways is quite common. Generally, such traffic sensors can provide input used to properly actuate traffic control devices in response to the detection or lack of detection of vehicles. For example, traffic sensors can enable a traffic control device to skip unnecessary signal phases, such as, for example, skipping a left hand turn phase when no vehicles are detected in a corresponding left hand turn lane. Traffic sensors can also enable a traffic signal to increase green light duration for major arterials by signaling the green light in the minor cross streets (and thus a red light for a major arterial) only when vehicles are detected on a cross street. Thus, traffic sensors assist in properly actuating a signalized intersection to improve traffic flow.

In addition to the actuation of signalized intersections of roadways for automobile traffic, traffic sensors are also used for the actuation of intersections of a roadway for automobile traffic with other thoroughfares such as pedestrian paths or railways. In this specification and in the following claims, the term roadway intersection means the intersection of two or more roadways for automobile traffic including the approaches to the intersection or the intersection of one or more roadways for automobile traffic with one or more thoroughfares for other traffic, including the approaches to the intersection.

Unfortunately, the cost of traffic sensors and cost of corresponding installation can be relatively high. Thus, traffic sensors and related costs can become a significant expenditure for municipalities. The high installation costs arise at least in part from the need to install sensors for every approach to an intersection and from the time required to configure the traffic sensors.

Typically, traffic signal lights have been actuated using inductive loop detectors embedded in the roadway. Inductive loop detectors are very expensive to install since lane closures are necessary. The high cost is compounded, especially for multi-lane multi-zone roadways, since a separate inductive loop detector is required for each detection zone. Furthermore, inductive loop detector technology is often unreliable and inductive loop detectors require a great deal of calibration. Configuration time for these sensors is significant since the loops must be manually tuned and physically wired into the traffic controller in the proper configuration. Thus, detection zones that are implemented by inductive loops must be manually configured by the physical placement of the loop in the roadway and the physical wiring of the loop detector output to the traffic controller.

Video detectors have been gaining popularity for traffic signal light actuation. To facilitate traffic signal light actuation, a video camera is placed high above a signal arm such that the video camera's view covers one approach to the intersection. The video signal from the camera is digitally processed to create detection indicators when a vehicle is located in the configured zones. Since a dedicated mounting arm is often necessary and one camera per approach is required, the installation of a video detector system can also be expensive and time consuming. Furthermore, a time consuming manual configuration is required to configure the detection zones and associate them with the proper traffic signal phases. Even if a traffic governing agency has a set of guidelines that dictate the desired locations and functions of the detection zones, these zones must be manually entered into the video detector configuration.

Microwave detectors have also been used in intersections to provide detection coverage over limited areas. However, similar to video detectors, one unit per approach is required and manual configuration is needed to ensure that the detection zones are configured properly for each sensor. Furthermore, the detection indicator output from each sensor must be manually wired to the proper traffic controller input that corresponds to the correct signal phase. Acoustic sensors have also been used in intersections to cover limited detection zones. These sensors also require one unit per approach and must be manually pointed and configured to achieve detections in the desired zone.

Therefore systems, methods, and computer program products that facilitate automated configuration of detection zones and automated association of detection zones with traffic signal phases would be advantageous.

BRIEF SUMMARY OF THE INVENTION

The foregoing problems with the prior state of the art are overcome by the principles of the present invention, which are directed towards methods, systems, and computer program products for configuring detection zones and for associating detection zones with traffic signal phases. In some embodiments, a sensor acquires sensor data from one or more transducer views that cover a roadway intersection. The sensor detects non-stationary targets within one or more of the transducer views based on the acquired sensor data. The sensor identifies a common target path for at least one detected non-stationary target having a path through the intersection. The sensor detects stationary targets within the one or more transducer views based on the acquired sensor data;

The sensor identifies the common target positions for stationary targets for at least one stationary target associated with an intersection. The sensor configures the detection zones based on common target paths and common target positions. A computerized traffic detection system (e.g., a master unit) creates an association of detection zones with corresponding traffic signal phases. The sensor generates digital data from the target detections, from the detection zone configurations, and from other elements of the sensor configuration. The generated digital data is used in rendering an aerial view of the roadway intersection.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 12 depicts an example transducer view power level matrix.

DETAILED DESCRIPTION OF THE PREFERRED EMBODIMENTS

The principles of the present invention provide for configuring detection zones and for associating detection zones with traffic signal phases. In some embodiments, a sensor acquires sensor data from one or more transducer views that cover a roadway intersection. The sensor detects non-stationary targets within one or more of the transducer views based on the acquired sensor data. The sensor identifies a common target path for at least one detected non-stationary target having a path through the intersection. The sensor detects stationary targets within the one or more transducer views based on the acquired sensor data.

The sensor identifies the common target positions for stationary targets for at least one stationary target associated with an intersection. The sensor configures the detection zones based on common target paths and common target positions. A computerized traffic detection system (e.g., a master unit) creates an association of detection zones with corresponding traffic signal phases. The sensor generates digital data from the target detections, from the detection zone configurations, and from other elements of the sensor configuration. The generated digital data is used in rendering an aerial view of the roadway intersection.

Figure 1:
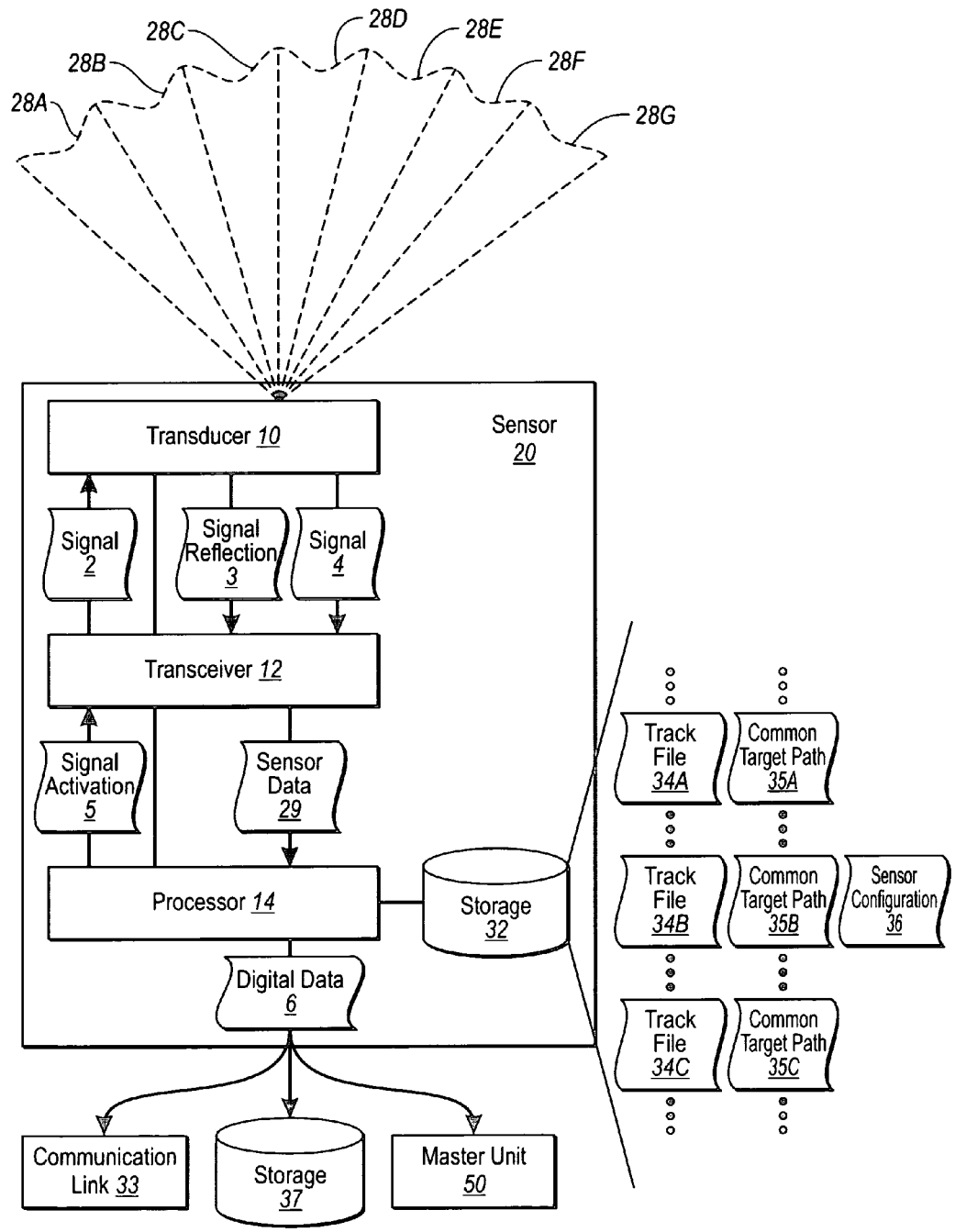
FIG. 1 depicts an example intersection traffic sensor.

FIG. 1 is an example intersection traffic sensor 20. Generally, intersection traffic sensor 20 can be used to detect targets (e.g., vehicles, pedestrians, etc.) at the roadway intersection. A target detection occurs when a signal is reflected off of a portion of the target and the sensor receives the signal, or when a signal emanates from a portion of the target and the sensor receives the signal. For example, if a sensor receives a signal that is reflected off of a vehicle bumper, then detection has occurred. The entire target need not be detected for detection to occur. Furthermore, a sequence of detections of the target is not necessary for a detection to occur. As depicted, traffic sensor 20 includes transducer 10, transceiver 12, processor 14, and storage 32.

Transceiver 12 is configured to generate signals (e.g., signal 2) and receive back corresponding signal reflections (e.g., signal reflection 3) that result from generated signals reflecting off of a target, such as, for example, a vehicle. A generated transmit signal can include a Frequency Modulated Continuous Wave ("FMCW") radar signal that is generated via direct digital synthesis and frequency multiplication. A transmit signal can also include one or more of a microwave transmit signal, an acoustic transmit signal, a laser transmit signal, an infrared transmit signal, and a pulse compression radar signal.

Transceiver 12 is also configured to receive signals (including any of previously described types of signals) from other sensors (e.g., signal 4) and receive signal reflections resulting from its own transmissions. In some embodiments, transceiver 12 is passive. In these passive embodiments, transceiver 12 does not generate a signal but can receive signals and/or signal reflections that are present in the environment. For example, in some passive acoustic sensor embodiments the sensor does not transmit a signal but only receives the acoustic signals generated by moving vehicles.

Processor 14 processes signals and signal reflections received by transceiver (collectively referred to as sensor data, such as, for example, sensor data 29) to convert signals and signal reflections into meaningful digital data (e.g., digital data 6). Based on sensor data, processor 14 can also generate track files, and store track files (e.g., track files 34A-34C) in storage 32. Stored track files can be subsequently accessed and manipulated (e.g., modified and deleted). In this specification and in the following claims "track file" is defined as a collection of data associated with a target (e.g., vehicle), which is used to monitor the movements of that target. A track file may contain information such as current position data that consists of range and azimuth angle information, starting position, position history, current vector velocity, vector velocity history, and radar return characteristics such as brightness, scintillation intensity, and signal spread in range.

Processor 14 can also generate a sensor configuration (e.g., sensor configuration 36) and store it in storage 32. As will be explained in detail below, the generation of the sensor configuration can include the generation of common target paths (e.g., common target paths 35A-35C) which can be stored in storage 32.

Processor 14 can be a digital signal processor configured to convert signals and signal reflections into digital data and deliver digital data to external components, such as, for example, communication link 33 (e.g., to a display device or another computer system), storage 37 (e.g., a magnetic disk, RAM, etc.), and master unit 50.

Digital data 6 can include, for example, sensor configuration 36, which can include: detection zone configurations, locations of lane boundaries, locations of permanent stationary targets, and roadway configuration (e.g., intersection, fork, interchange, bend).

Besides the sensor configuration, digital data 6 can also include: a detection indicator (which is based on track file position data, for example track files 34A-34C) corresponding to detection zones (which are stored in the sensor configuration for example sensor configuration 36); vehicle detections also based on position data stored in track files (e.g., 34A-34C); traffic statistics based on the movements stored in track files (e.g., 34A-34C). Traffic statistics can include: vehicle counts per lane; vehicle counts per direction; vehicle counts per approach; turning counts; average speeds per lane, direction, or approach; $85^{th}$ percentile speeds per lane, direction, or approach; occupancy per lane, direction, or approach, etc.

Processor 14 can also be configured to control transceiver 12. For example, processor 14 can send signal activation command 5 to transceiver 12 when transceiver 12 is to generate a signal.

Transducer 10 is configured to create areas (hereinafter referred to as "transducer views") over which a transmit signal is propagated and/or from which a signal and/or signal reflection is received. In some embodiments, transducer 10 creates multiple transducer views by switching between multiple fixed beam antennas, each one steered to a different angle. In alternate embodiments, multiple transducer views are created using a single antenna that is connected to the transceiver 12 via a rotary joint. The antenna is rotated around an axis so that a different transducer view is available at each instant in time. In still other alternate embodiments, an electronically steerable antenna implemented using phase shifters is used to electronically steer the antenna beam to different angles thus achieving the different transducer views.

These several transducer views form an aggregate sensor view when combined. Aggregate sensor view means a view as observed by a sensor composed of a plurality of transducer views. As depicted in FIG. 1, transducer 10 creates an aggregate sensor view including transducer views 28A-28G. A power level defining the edge of a transducer view can be configured based on the sensitivity of transceiver 12 and detection algorithms running on processor 14.

Figure 2:
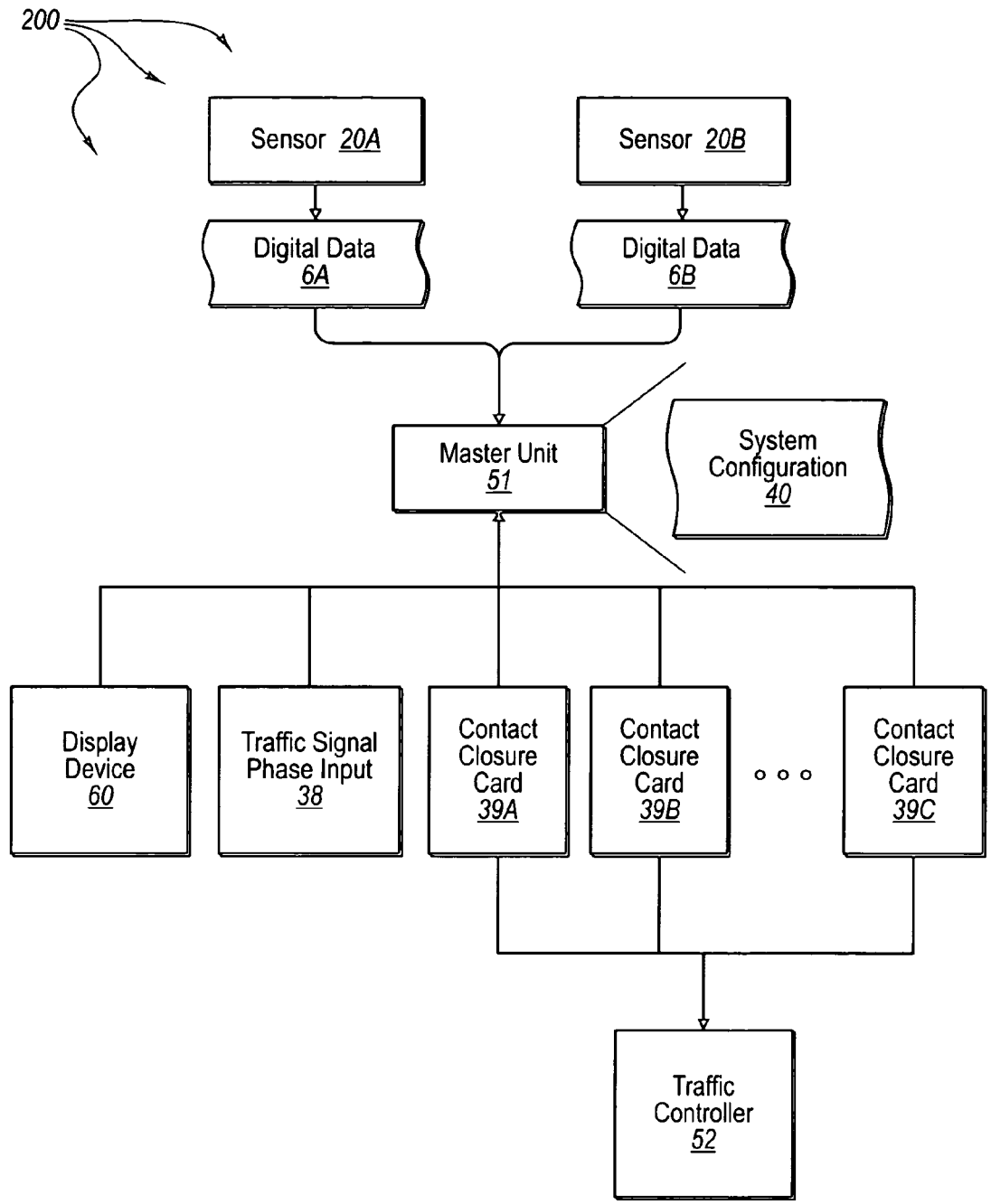
FIG. 2 depicts an example intersection detection system.

FIG. 2 depicts an exemplary intersection detection system 200. Intersection detection system 200 includes two traffic sensors 20A and 20B. Traffic sensors 20A and 20B can create digital data 6A and 6B and send the created digital data to master unit 51. In some embodiments traffic sensors 20A and 20B are traffic sensors similar to traffic sensor 20 depicted in FIG. 1. In other embodiments, traffic sensors 20A and 20B are inductive loop detectors or any other type of traffic sensor.

In some embodiments, master unit 51 is located in the traffic control cabinet and is used to interface to equipment in the traffic cabinet. For example, master unit 51 may interface with a display device (e.g., display device 60) that is used by a traffic technician to verify the traffic system configuration. Master unit 51 may also receive input from a traffic signal phase reader (e.g., traffic signal phase reader 38) that provides information indicating the state of each traffic signal phase (green, amber, or red). In some embodiments, master unit 51 also interfaces with contact closure cards (e.g., contact closure cards 39A, 39B, and 39C) that provide contact closure signals to the traffic controller (e.g., traffic controller 52). In other embodiments, the detection indicator signals are transmitted to the traffic controller directly via a serial communications bus.

Master unit 51 can also generate a system configuration (e.g., system configuration 40) that can be stored in master unit 51. A system configuration may contain all the same elements as a sensor configuration. Thus, for example, in single sensor embodiments, the sensor configuration may be considered the system configuration. As will be described in greater detail below, system configuration 40 may contain associations of detection zones with traffic signal phases. These associations are used when creating detection indicators for traffic signal phases of traffic controller 52.

Figure 3:
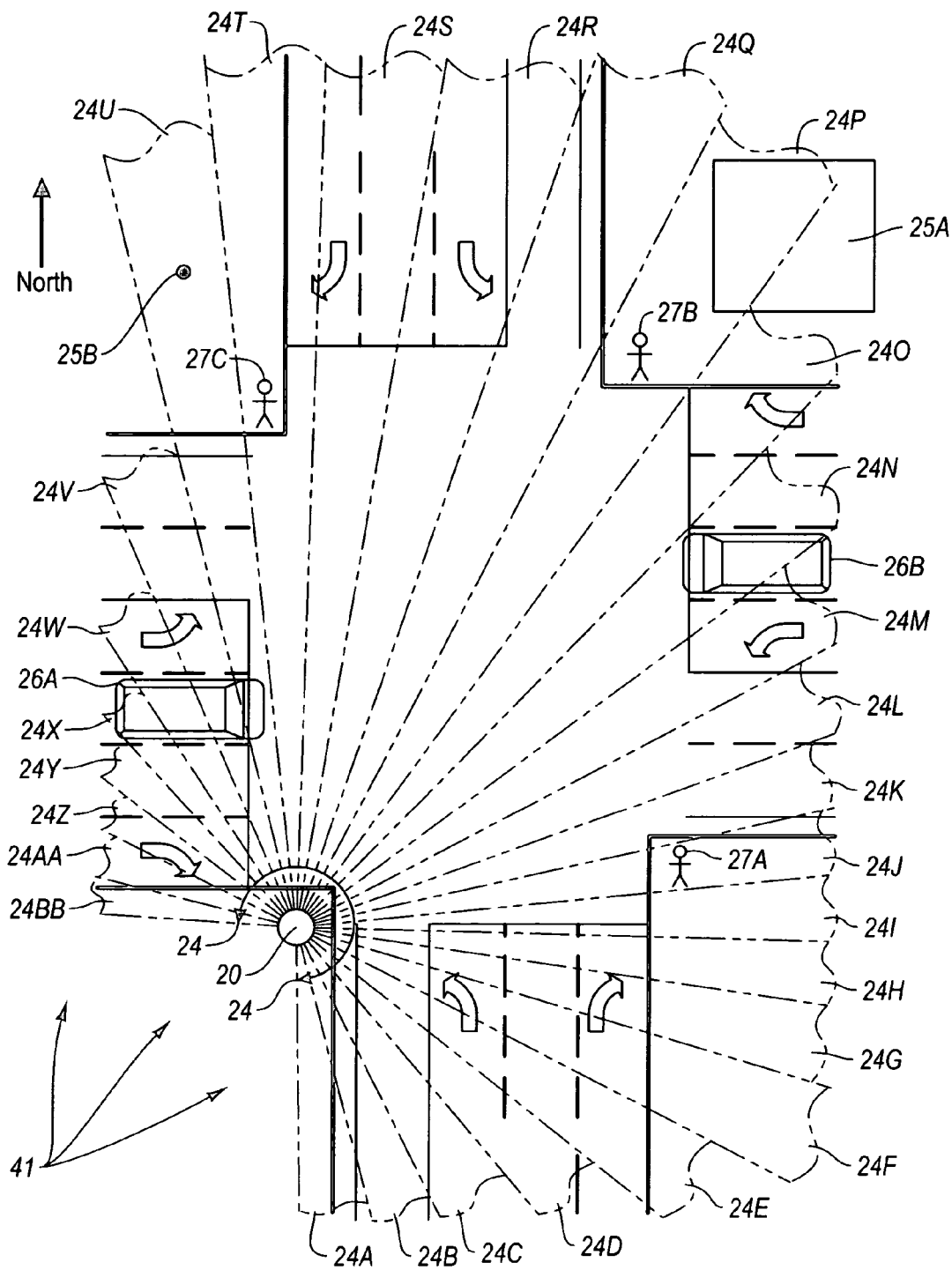
FIG. 3 depicts the example intersection vehicle traffic sensor of FIG. 1 in a roadway intersection and depicts a further aggregate sensor view.

FIG. 3 depicts the intersection traffic sensor 20 of FIG. 1 in a roadway intersection 41. Sensor 20 utilizes multiple transducer views 24A-24BB which, in combination, form the aggregate sensor view 24. For simplicity, the extent of the aggregate sensor view 24 is depicted as rectangular. However, the extent of the aggregate sensor view 24 is actually defined by the limits of sensor 20's capabilities and is not necessarily rectangular.

Transducer 10 (of FIG. 1) can be configured to switch (e.g., radar) signal transmission between transducer views 24A-24BB on (transmitting and receiving a signal) and off (not transmitting nor receiving a signal) in sequence. Transceiver 12 (of FIG. 1) can receive a reflected signal (e.g., a radar return) from a range in each of the transducer views 24A-24BB. The range is the distance between sensor 20 and the targets 26A and 26B. By using each of the transducer views 24A-24BB, sensor 20 can receive a radar return from multiple azimuth angles, which are measured in the horizontal plane.

In alternate embodiments, sensor 20 has azimuth and elevation angle scanning capability and thus is capable of obtaining radar returns from varying range, azimuth, and elevation positions. The detection and detection zone configuration methodologies described below can be adapted for use in those alternate embodiments.

Figure 4:
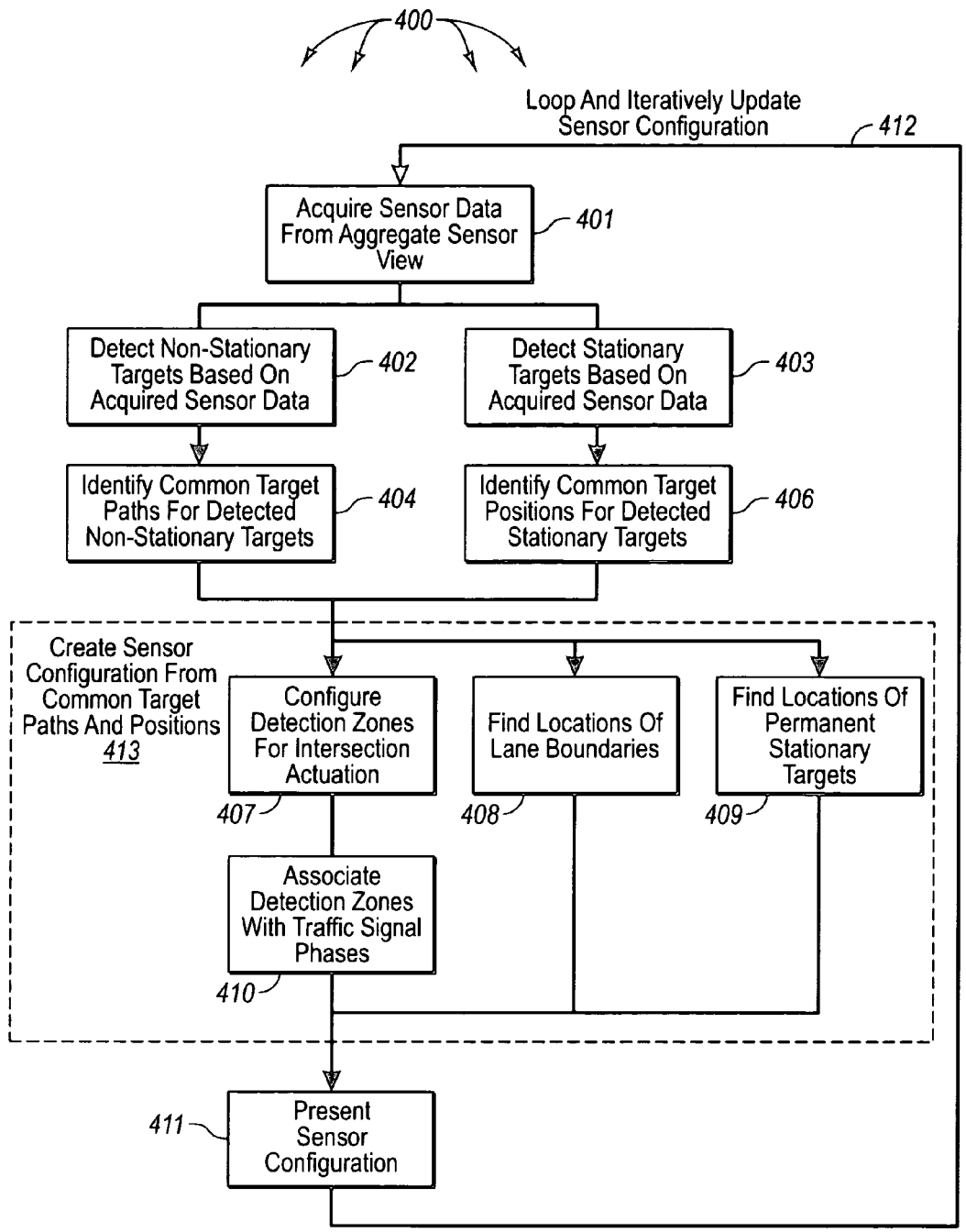
FIG. 4 illustrates an example flow chart of a method for creating a sensor configuration.

FIG. 4 illustrates an example flow chart of a method 400 of creating a sensor configuration. Method 400 will be described with reference to the components and data in FIGS. 1, 2 and 3.

Method 400 includes an act of acquiring sensor data from an aggregate sensor view (act 401). For example, sensor 20 can acquire sensor data (similar to sensor data 29) for targets within intersection 41. Thus, sensor 20 can sense any of targets 25A, 25B, 26A, 26B, 27A, 27B, and 27C based on reflections from one of the sensor views 24A-24BB. For example, sensor 20 can sense when target 26A comes in range of sensor view 24X. Similarly, sensor 20 can sense that target 25A is in sensor view 24P. Sensor 20 can continue to acquire sensor data (e.g., reflections) for a target as long as the target is within one of the sense views 24A-24BB, including transitions between sensor views.

Method 400 also includes an act of detecting non-stationary targets based on acquired sensor data (act 402). For example, sensor 20 can detect non-stationary targets associated with intersection 41 based on sensor data acquired for targets 25A, 25B, 26A, 26B, 27A, 27B, and 27C. Non-stationary targets can be distinguished from stationary targets by using high-pass filtering. The signal reflected from a non-stationary target changes more rapidly from one moment to the next due to the change in position of the target. On the other hand, the signal reflected from a stationary target is relatively constant.

Applying a high pass filter to acquired sensor data or to other data derived from acquired sensor data differentiates signals having a reduced rate of change or, for example, that are constant signals. Thus, signals having an increased rate of change can be detected. Accordingly, detection of non-stationary targets can include applying a high-pass filter to sensor data and the subsequently applying a noise based threshold to the filtered data to further distinguish targets from noise.

Thus, it may be that sensor 20 detects targets 26A and 26B as non-stationary (vehicular) targets. For example, processor 14 can apply a high-pass filter and noise based threshold to acquired sensor data for intersection 41 to differentiate targets 26A and 26B as non-stationary targets.

Method 400 includes an act of identifying common target paths for detected non-stationary targets (act 404). For example, sensor 20 can identify common target paths for detected non-stationary targets in intersection 41. Identifying common targets paths for detected non-stationary targets can be perform in any number of ways.

In this specification and in the following claims "common target path" is defined as a path that is commonly traveled as dictated by the geometry of the roadway intersection or as observed by sensor measurements.

Figure 5:
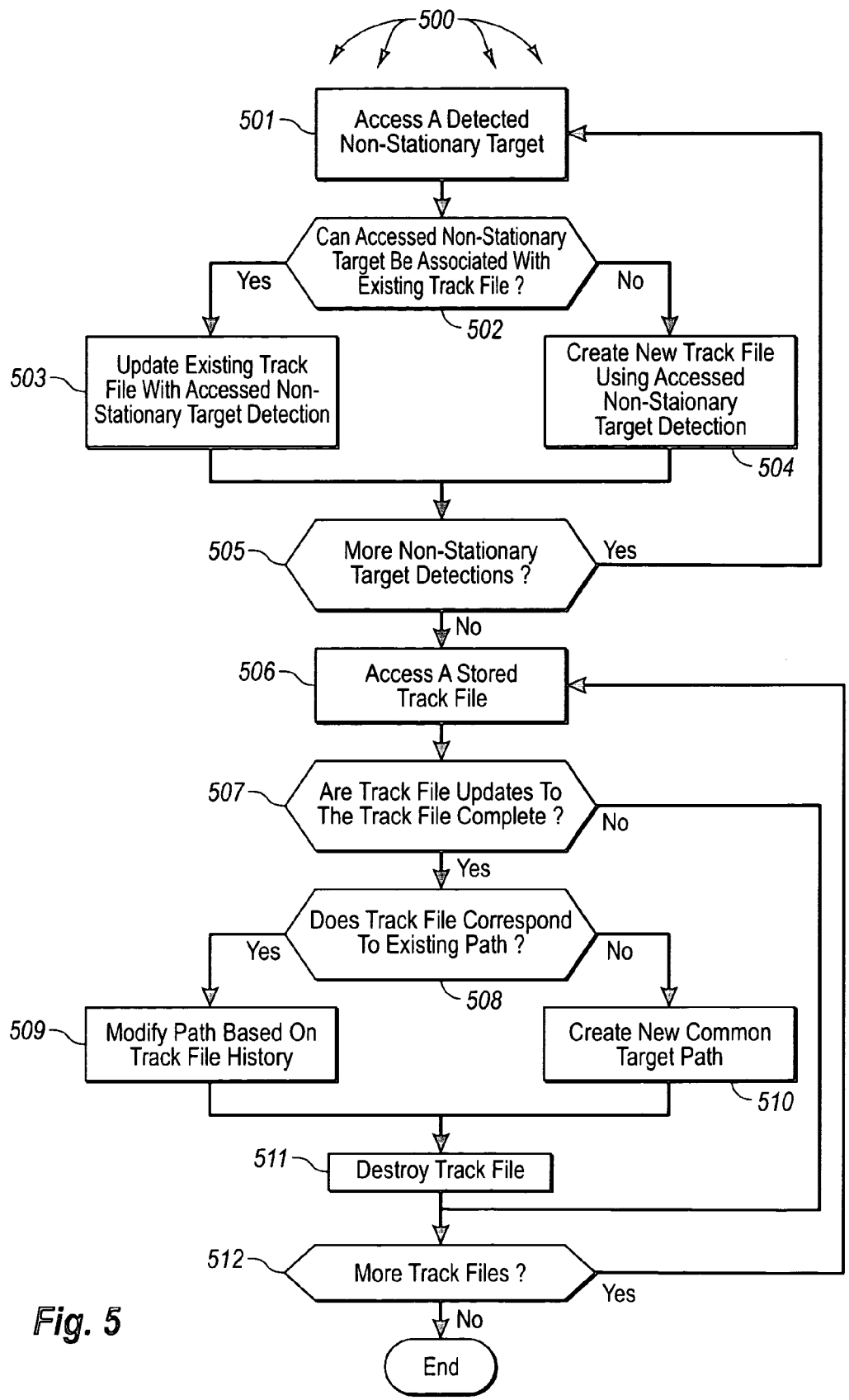
FIG. 5 illustrates an example flow chart of a method for identifying common target paths for detected non-stationary targets.

FIG. 5 illustrates an example flow chart of a method 500 for identifying common target paths for detected non-stationary targets. Reference is now made to FIG. 5 to describe the method 500 for identifying common target paths for detected non-stationary targets.

Method 500 includes act of accessing a detected non-stationary target (act 501). For example, processor 14 can access a detected non-stationary target from intersection 41, such as, for example, target 26A. If there are no detected non-stationary target detections, processing transitions to act 506.

Method 500 includes an act of determining if the accessed non-stationary target can be associated with an existing track file (decision block 502). For example, processor 14 can determine if target 26A can be associated with any of track files 34A-34C. Determining if a non-stationary target can be associated with a track file can include comparing the non-stationary target to the track file. For example, an expected location for a target can be compared to the actual detected location of the non-stationary target. If the results of the comparison (e.g., the difference in expected and actual position) satisfy a specified threshold (e.g., is small enough), the non-stationary target can be associated with the track file.

If the accessed non-stationary target detection can be associated with an existing track file (YES at 502), method 500 includes an act of updating the existing track file with the accessed non-stationary target detection (act 503). Thus, if a track file for target 26A (e.g., track file 34A) is created from a detection located 25 feet out in transducer view 24W on one observation, a detection located 25 feet out in transducer view 24V on a second observation would also be associated with this same track file. Processor 14 can update track files in storage 32 as appropriate.

If the accessed non-stationary target detection cannot be associated with an existing track file (NO at 502), method 500 includes an act of creating a new track file with the accessed non-stationary detection (act 504). For example, when target 26A is first detected in transducer view 24X, a new track file can be created for target 26A. Processor 14 can create and store new track files in storage 32 as appropriate.

Method 500 includes an act of determining if there are more non-stationary target detections (decision block 505). When there are more non-stationary target detections (YES at 505), one or more of acts 501, 502, 503, and 504 can be repeated for each non-stationary target detection. Thus it may be that method 500 essentially loops through one or more of acts 501, 502, 503, and 504 for each non-stationary target detection.

When there are no more non-stationary target detections (NO at 505), method 500 includes act of accessing a stored track file (act 506). For example, processor 14 can access track file 34A. Method 500 includes an act of determining if track file updates to the track file are complete (decision block 507). Updates to a track file can be viewed as being complete when no updates with a new detection are added to a track file for a predetermined length of time. For example, once a vehicle that is being tracked leaves aggregate sensor view 24, the track file that corresponds to this vehicle will no longer be updated with new detections. Thus, a predetermined length of time after vehicle 26A leaves aggregate sensor view 24, processor 14 can consider a corresponding track file (e.g., track file 34A) complete.

When a track file is complete (YES at 507), method 500 can include an act of determining if the track file corresponds to an existing path (decision block 508). For example, processor 14 can determine if track file history of track file 34A corresponds to common target paths 35A-35C. In some embodiments, when a track file is complete, the location history (or the path of the non-stationary target associated with the track file) is compared to the existing list of common target paths. Thus, for example, processor 14 can compare track file 34A to common target paths 35A-35C.

If a common target path and the location history stored in a track file have a requisite amount of similarity, the common target path can be viewed as corresponding to the track file. Thus, when track file 34A and common target path 35A have a requisite amount of similarity, track file 34A can viewed as corresponding to common target path 35A. The measure of similarity between track file location history and the common target path can be the mean square error between the two. For example, the mean square error between the track file location history for vehicle 26A's path in the northern east bound through lane of FIG. 2 (e.g., from track file 34A) and an existing common target path representing the northern east bound through lane (e.g., common target path 35A) will be small.

On the other hand, if a common target path and the location history stored in a track file do not have a requisite amount of similarity, the common target path is not viewed as corresponding to the track file. Thus, when track file 34A and common target path 35B do not have a requisite amount of similarity, track file 34A is not viewed as corresponding to common target path 35B. For example, the mean square error between the track file location history for vehicle 26A's path in the northern east bound through lane of FIG. 2 (e.g., from track file 34A) and an existing common target path (e.g., common target path 35B) representing a left hand turn changing from an eastbound direction to a northbound direction will be larger.

When a track file does correspond to an existing path (e.g., there is a requisite amount of similarity), method 500 includes an act of modifying the path based on the track file history (act 509). For example, processor 14 can modify the common target path for the northern east bound through lane of FIG. 3 (e.g., common target path 35A) based on the track file location history for vehicle 26A (e.g., track file 34A). Modification can be accomplished by averaging the track file location history with the common vehicle path and weighting the track file location history lower than the common vehicle path.

On the other hand, when a track file does not correspond to an existing path (e.g., there is not a requisite amount of similarity), method 500 includes an act of creating a new path (act 510). For example, processor 14 can create common target path 35A. A new common target path can be created using a track file location history. For example, common target path 35A can be created from track file location history for track file 34A. A new common target path can be equivalent to the track file location history from which it is created. Thus, it may be that common target path 35A is equivalent to tack file location history for track file 34A.

Method 500 includes an act of destroying a track file (act 511). A track file can be destroyed after it has been used to modify an existing common target path or to create a new common target path. For example, after using track file 34A to modify or create a common target path 35A (e.g., for the northern east bound through lane of FIG. 3), processor 14 can delete track file 34A.

Method 500 includes an act of determining if there are more track files (decision block 512). For example, processor 14 can scan storage 32 for any unprocessed track files. When it is determined that there are more track files (YES at 512), one or more of acts 506, 507, 508, 509, 510, and 511 can be repeated. On the other hand, when it is determined that there are not more track files (NO at 512), method 500 can end. Thus it may be that method 500 essentially loops through or more of acts 506, 507, 508, 509, 510, and 511 for each track file.

In other embodiments, target detections (both stationary and non-stationary) can be used in method 500. These embodiments may be preferable for situations in which a target must be tracked while it stops moving and then starts moving again.

In still other embodiments, the common target paths are identified using a two-dimensional histogram of target detections. This histogram will show the areas in which targets most commonly travel. The histogram of target detections can be used by itself or in conjunction with track files to identify the common target paths.

Referring back to FIG. 4, method 400 includes an act of detecting stationary targets based on acquired sensor data (act 403). Act 403 can include applying a low pass filter to acquired sensor data to remove any changing signals (or moving targets) and then applying a noise based threshold detection to distinguish noise from targets. For example, stationary targets 25A and 25B and any stationary vehicular targets within the range of one or more of the transducer views of sensor 20 can be detected as stationary targets. A stationary target is a target that has zero velocity for a period of time.

Method 400 includes an act of identifying common target positions for detected stationary targets (act 406). For example, processor 14 can create a two-dimensional histogram of stationary vehicle detections. Each stationary vehicle detection is used to increment the bin in the two-dimensional histogram that corresponds to the location of the detection. The features in the two-dimensional histogram indicate the common target positions.

In this specification and in the following claims "common target position" is defined as a position that is commonly occupied as dictated by the geometry of the roadway intersection or as observed by sensor measurements.

Figure 6:
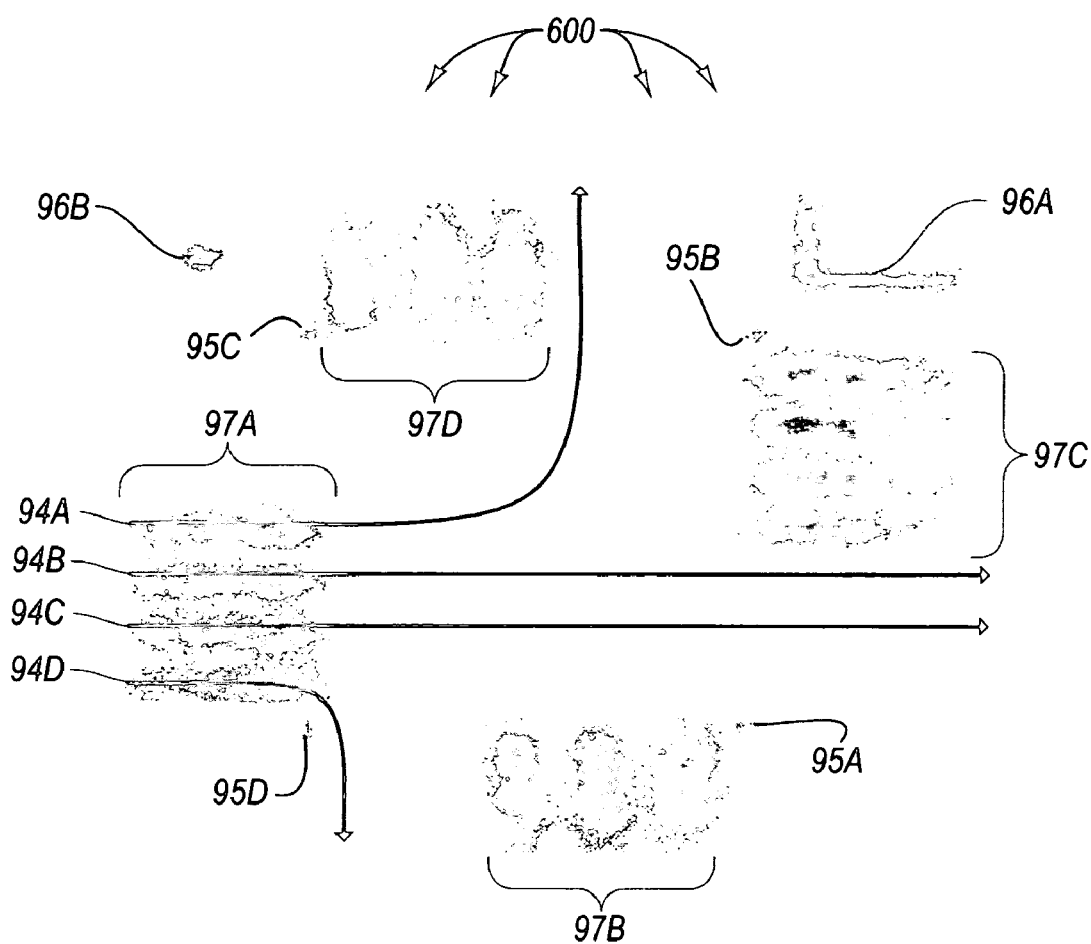
FIG. 6 depicts an example histogram of stopped vehicles and stationary targets with common target paths superimposed.

FIG. 6 is an exemplary two-dimensional histogram of stationary detections. The darker shaded portions indicate the areas where larger numbers of stationary target detections have occurred. The permanent stationary targets 25A and 25B show up in the two-dimensional histogram as features 96A and 96B. The vehicular stationary targets show up in the two-dimensional histogram at the stop bars as shown by features 97A, 97B, 97C, and 97D and the pedestrian stationary targets show up in the two-dimensional histogram at the intersection corners near the cross walks as shown by features 95A, 95B, 95C, and 95D.

Method 400 includes a functional-result oriented step for creating sensor configuration from common target paths and common target positions (step 413). Step 413 can include any corresponding acts for creating sensor configuration from common target paths and common target positions.

However, as depicted in FIG. 4, step 413 includes a corresponding act of configuring detection zones for intersection actuation (act 407). Detection zones can be vehicular detection zones located on the roadway or pedestrian detection zones located in pedestrian lanes (i.e. sidewalks and crosswalks). For example processor 14 can configure detection zones for intersection 41 from common target paths 35A-35C and identified common target positions. Configuring a detection zone can include assigning the location of a detection zone and the functionality of a detection zone to a sensor configuration. For example, processor 14 can assign zones from intersection 41 to sensor configuration 36 with the functionality of creating detection indicators when one or more vehicles are located within the detection zone. The detection indicators will be used for actuating traffic control devices of intersection 41.

Figure 8:
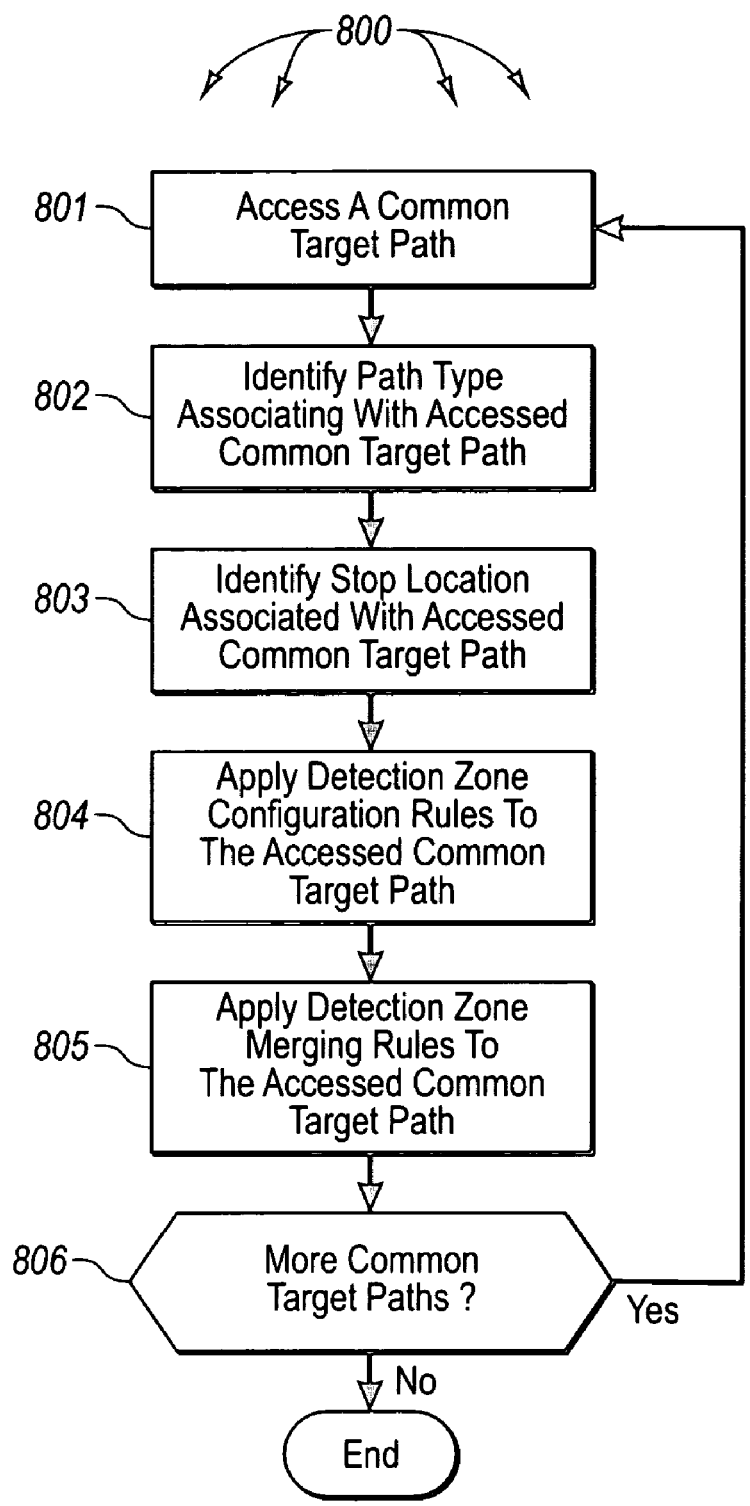
FIG. 8 illustrates an example flow chart of a method for configuring detection zones.

FIG. 8 illustrates an example flow chart of a method 800 for configuring detection zones. Reference is now made to FIG. 8 to describe the method 800 for configuring detection zones.

In this specification and in the following claims "detection zone" is defined as an area and a corresponding set of rules that dictate the circumstances under which a detection indicator should be created. For example, a common type of vehicular detection zone dictates that a detection indicator be created when one or more vehicles are located within a predefined area. Another exemplary detection zone dictates that a detection indicator be created when three or more vehicles are located within a predefined area. Still another exemplary detection zone dictates that a detection indicator be created when a vehicle is located on the approach to an intersection and is traveling at such a speed so that the vehicle will arrive at the intersection at a predetermined time (this type of detection zone is useful in creating dilemma zone detection indicators). In another exemplary detection zone, the area is a line and a detection indicator is created when a vehicle crosses the line. At an intersection of roadways, there are detection zones that are used for traffic light actuation. These detection zones are typically located: in the through traffic lane near the stop bar; in the right hand turn lane near the stop bar; in the left hand turn lane at the stop bar and three cars back from the stop bar; and in the through traffic lanes near the dilemma zone. A dilemma zone is an area located on the approach to the stop bar in which the behavior of a driver (as to whether he or she will stop or not) is unpredictable if the traffic light turns from green to amber while he or she is in that zone.

Traffic governing agencies have their own preferred detection zones and their own preferred locations for their preferred detection zones. The definitions of these detection zones and detection zone locations are typically included in the agencies' guidelines. In some embodiments, method 800 is implemented to configure detection zones that correspond to the guidelines of the pertinent traffic governing agency. This is achieved by creating detection zone configuration rules that when applied will result in the detection zones defined by the agency's guidelines.

Method 800 includes an act of accessing a common target path (act 801). For example, processor 14 can access common target path 35A.

Method 800 includes an act of identifying a path type associated with the accessed common target path (act 802). For example, processor 14 can identify a type of path for common target path 35A. A common target path can be identified as a vehicular path straight through the intersection, a right turn or left turn, as a pedestrian path through a cross walk, etc. The type of path can be identified by the location of the path with respect to the other paths and the existence of a left hand turn, a right hand turn, or no turn in the path.

Method 800 includes an act of identifying a stop location associated with the accessed common target path (act 803). For example, processor 14 can identify stop locations for common target path 35A. A path may have one location that is considered the stop location. For example, for a vehicular path, there may be one stop location at or near a stop bar. The stop location can be found by overlaying the path (e.g., 94A, 94B, 94C, or 94D) on top of the stationary target two-dimensional histogram as shown in FIG. 6. By overlaying the path in this way, a measure of the number of stationary vehicle detections (from the two dimensional histogram) can be associated with every point on the path.

A point along the path at which the number of stationary target detections suddenly drops is considered the stop location. For example, the number of stationary vehicle detections right before the stop bar is higher but the number of stationary vehicle detections right after the stop bar is lower. Thus, in the case of a vehicular path the sudden drop in stationary target detections will happen near the stop bar. In the case of a pedestrian path this can occur at a corner where pedestrians wait for a green light (or a "walk" indication).

Method 800 includes an act of applying detection zone configuration rules to the accessed common target path (act 804). For example, processor 14 can apply a detection zone configuration rules to common target path 35A. Thus it may be that for a vehicular path straight through intersection 41, a detection zone is configured extending from the stop location back 20 feet. The width of the detection zone can be configured to extend to the lane boundaries. The location of the detection zone in the left hand turn lane three cars back from the stop bar can be configured using the left hand turn vehicular path so that it extends from 60 feet behind the stop location to 80 feet behind the stop location. The location of a dilemma zone detection zone can be configured based on the stop location as well as the average speed of travel on the roadway. At least for this purpose, the average speed of travel can recorded within common target paths. For example, if the average speed associated with a common target path is 35 MPH then the dilemma zone detection zone can be placed so that it encompasses 31 feet to 77 feet behind the stop bar.

Dilemma zone detection zone can also be configured based on the speed of individual vehicles. That is, the sensor can configure a dilemma zone detection zone that will trigger a detection indicator for the dilemma zone based on the actual speed of the individual vehicle. In this case, the area corresponding to the detection zone would encompass the entire approach to the intersection and a detection indicator will only be created if the speed of the vehicle is such that it will arrive at the intersection in a predetermined number of seconds.

Another detection zone that can be configured by the sensor is a center zone covering the center of the intersection. A center zone can be configured to create a detection indicator only if the vehicles are stopped or moving slowly in this area. This type of detection zone can be useful in situations in which the traffic is backed up into the intersection. When this happens, a traffic controller can immediately provide red lights in all directions preventing additional traffic from entering the intersection.

Method 800 includes an act of applying detection zone merging rules to the accessed common target path (act 805). For example, processor 14 can applying detection zone merge rules to common target path 35A. Thus, for example, after detection zones have been configured for an accessed path, detection zones can be compared to existing other detection zones to determine if they can be merged. An example of detection zones that might be merged is two adjacent detection zones on vehicular paths straight through the intersection. When detection zones in adjacent through lanes are merged, a rule is applied to the resulting detection zone so that a detection in any portion of the detection zone would cause a detection indicator to be created for that zone. Traffic controllers typically do not distinguish detection indicators from the different through lanes of traffic. Thus, only one zone and one detection indicator for all the through lanes is needed.

Method 800 includes an act of determining if there are more common target paths (decision block 806). For example, processor 14 can determine if there are more common target paths in storage 32. When it is determined that there are more common target paths (YES at 806), one or more of acts 801, 802, 803, 804, and 805 can be repeated. On the other hand, when it is determined that there are not more common target paths (NO at 806), method 800 can end. Thus it may be that method 800 essentially loops through acts 801, 802, 803, 804, and 805 for each common target path.

In alternate embodiments, the configuration of detection zones can be performed based on the target paths of individual targets instead of common target paths of multiple targets. In these embodiments the detection zones can be configured using the method 800 as described in FIG. 8 with the use of a target path instead of a common target path. Furthermore, in these alternate embodiments, the target paths can be identified by updating track files as described by method 500 in FIG. 5 but there is no need to create and modify common target paths as described by acts 510 and 509.

Referring back to FIG. 4, step 413 includes a corresponding act of associating detection zones with traffic signal phases (act 410). For example processor 14 can associate detection zones for intersection 41 with phases of traffic control signals that control the flow of traffic through intersection 41. A traffic signal phase is a part of the traffic signal time cycle allocated to any combination of traffic movements that receive the right of way together. For example, the northbound through lanes of a main thoroughfare would typically all be given the same traffic signal (a green, amber, or red light). This group of traffic lights is called a traffic signal phase. Virtually any scheme can be used for signal phase numbering.

Figure 7:
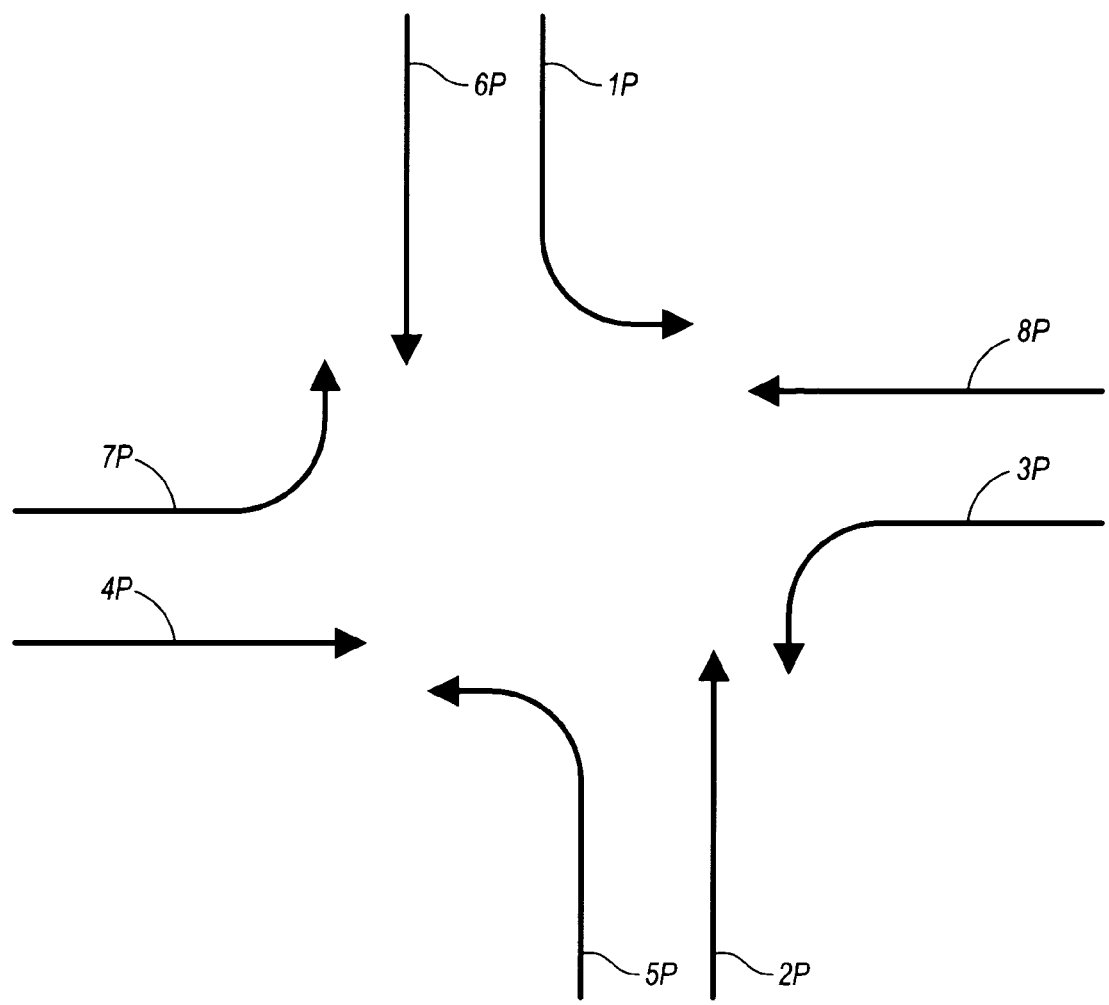
FIG. 7 depicts an example of traffic signal phase numbering.

FIG. 7 depicts an example of traffic signal phase numbering 700 based on the National Electrical Manufacturers Association ("NEMA") standard signal phase numbering. Phase two 2P is assigned to the through lanes on the major arterial that are either northbound or westbound. If both arterials are the same size then phase two 2P is assigned to the northbound through lanes. All other phases are numbered in relation to phase two 2P.

A detection zone can be associated with a specific traffic signal phase so that a detection indicator from the detection zone will register a call for right-of-way on the appropriate traffic signal phase. The association of a detection zone with a traffic signal phase has traditionally been performed by a technician who wires a contact closure signal (i.e. the detection indicator) from the detection zone into the appropriate input on the traffic controller. To reduce installation time, master unit 50 can perform this association as described by act 310.

A traffic cabinet (e.g., a NEMA TS2 traffic cabinet) can be equipped with a card bus that includes a unique voltage signal for each card slot. Furthermore, each slot in the card bus has two contact closure input channels (a top channel and a bottom channel). Traffic governing agencies (e.g., city traffic engineers and state departments of transportation) each have their own guidelines that dictate which slot in the card bus a contact closure card corresponding to a particular traffic signal phase should be inserted and on which channel in that slot the contact closures should occur. For example, according to the guidelines of one traffic governing agency, the contact closure card that generates a contact closure signal for actuation of traffic signal phase 2P is inserted into slot 2 with contact closures occurring on the top channel.

As previously described with respect to FIG. 2, a contact closure card (e.g., contact closure card 39A) can communicate with a master unit (e.g., master unit 51). Thus, a contact closure card can transmit a slot number (into which it is inserted) to the master unit. The master unit, which has in memory the applicable guidelines, can infer based on the slot number the traffic signal phases for which this card will generate contact closures on the top and bottom channels. Accordingly, once the master unit (e.g., master unit 51) has associated a detection zone with the traffic signal phase corresponding to a contact closure card (e.g., contact closure card 39A), the master unit can then cause the correct contact closure card to create a contact closure signal for actuation of the appropriate traffic signal phase.

In other types of cabinets in which the card bus slot cannot be determined automatically, an installer can specify which contact closure card should be associated with which traffic signal phase. The installer can do this by using a thumb wheel dial (or other user input device) on the contact closure card. Once this step is performed, the association of a detection zone with a contact closure card (and corresponding signal phase) can be performed automatically.

The act associating detection zones with traffic signal phases can be performed in a variety of different ways. Referring back to FIG. 2, intersection detection system 200 includes traffic signal phase input 38, which provides indications of the traffic signal light phases to master unit 51. When a traffic signal phase input (e.g., traffic signal phase input 38) is installed in intersection detection system 200, the master unit 51 performs detection zone associations by monitoring the detection indicators from a particular detection zone and identifying detection patterns.

Transitioning back to FIG. 7, when phase two 2P and phase six 6P are green and all other phases are red as indicated by traffic signal phase input 38, traffic will be flowing in the lanes corresponding to phase two 2P and phase six 6P. The detection indicators from the detection zones in these lanes will be intermittent. The intermittent detection pattern is an example of a pattern that master unit 51 can identify.

Master unit 51 then associates the detection pattern with a corresponding traffic signal phase. For example, the traffic signal phases corresponding to phase two 2P and phase six 6P will indicate a green light at the same time that detection zones in these lanes report an intermittent detection pattern. Thus, these detections zones correspond to either phase two 2P or phase six 6P. Since the traffic signal phases for phase two 2P and for phase six 6P were green simultaneously, master unit 51 may not be able to determine which detection zone should be associated with phase two 2P and which should be associated with phase six 6P. Thus, a possible association is created and the process is repeated until either phase two 2P or phase six 6P receives the right-of-way (is lit green) while the other phase does not (is lit red). When this occurs master unit 51 will be able to positively associate a detection zone with its corresponding phase.

Alternatively, the user may provide input to distinguish between phase two 2P and phase six 6P.

In the absence of a traffic signal phase input, the traffic signal phases can be associated with detection zones using common target paths and the following methodology. Firstly, a major arterial is identified. This is done by comparing the total number of through lanes (i.e., common target paths passing straight through the intersection) in one arterial to the total number of through lanes in the other arterial. The arterial with the greater number of through lanes is considered the major arterial. For example, if an intersection has two northbound lanes, three southbound lanes, two eastbound lanes, and two westbound lanes then the north-south arterial has one more through lane and is considered the major arterial.

Once the major arterial is identified the approach with northbound or westbound traffic must be identified. In some embodiments, an electronic compass is integrated into the traffic sensors (e.g., traffic sensors 20A and 20B). The compass will indicate the direction the sensor is pointed and thus the common target paths (and corresponding traffic lanes) can be associated with an absolute direction of travel. In other embodiments, for example, when an electronic compass is not integrated into the sensors, user input can define one of the traffic signal phases and/or the pointing direction of the sensor.

After identifying the major arterial and the direction of that arterial, the traffic signal phases are assigned, for example, according to the NEMA standard.

Referring now back to FIG. 4, Step 413 includes a corresponding act finding the locations of lane boundaries (act 408). For example, processor 14 can find locations of lane boundaries for intersection 41 from common target paths 35A-35C and identified common target positions. Processor 14 can assign locations of lane boundaries for intersection 41 to sensor configuration 36.

Figure 9:
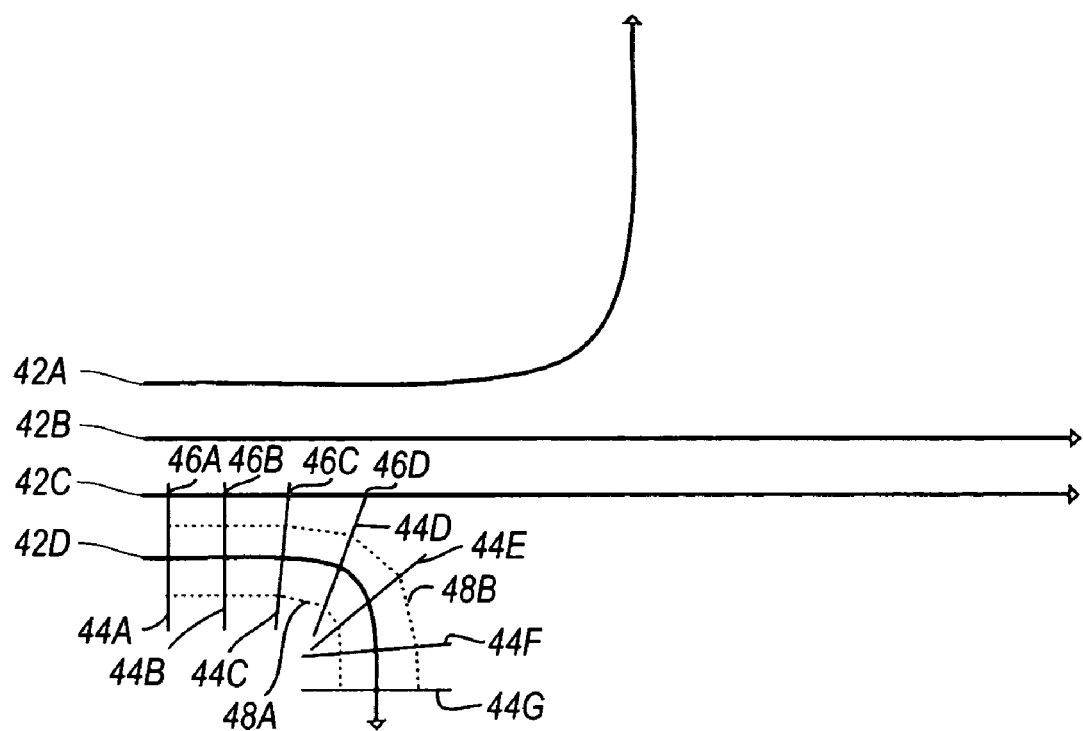
FIG. 9 depicts the common target paths with normally intersecting lines and lane boundaries.

Numerically, the lane boundaries can be found by looping through each common target path. FIG. 9 depicts common target paths with normally intersecting lines and lane boundaries. Referring now to FIG. 9, lines are drawn normal to the direction of travel for each path at various points along the length of the path. Lines 44A-44G are examples of these normal lines. If these lines intersect other common target paths within a predetermined distance (e.g., 20 feet), as exemplified at 46A-46D, then the lane boundary between the two paths (exemplified by the first portion of 48B) is located halfway between the two paths and on the normal line. If the normal line does not intersect another path within the predetermined distance then the lane boundary is drawn a predetermined distance from the path (e.g., 6 feet), as exemplified by 48A and the second portion of 48B.

Referring again back to FIG. 4, step 413 includes a corresponding act of finding the locations of permanent stationary targets (act 409). For example, processor 14 can find the locations of locations of 25A and 25B (e.g., buildings, signs, poles), from identified common target positions. Processor 14 can assign locations of 25A and 25B to sensor configuration 36.

Referring briefly to FIG. 6, a histogram, such as, for example, histogram 600, can be used to find the locations of permanent stationary targets. The areas in the histogram that are near common target paths are masked out. Any portions of the stationary target histogram 600 representing a large number of detections that are outside the masked off areas are considered locations of permanent stationary targets. Areas 96A and 96B are examples of these areas. Permanent stationary targets may include poles, signal arms, signs, cabinets, curbs, parking meters, parked vehicle, medians, and buildings In other embodiments the sensor configuration includes the roadway configuration. Detecting a roadway configuration includes: detecting the angle of intersection of two roadways, detecting a forking of a roadway, detecting a bend or a corner in a roadway, detecting a roundabout, and detecting an interchange between roadways. These roadway configurations can be identified by comparing the common target paths to templates for each of the different configurations.

In other embodiments, a sensor configuration may contain other elements such as the locations of pedestrian lanes, the locations of parking stalls, the locations of driveways (i.e. roadway entry and exit points), etc.

Method 400 includes an act of presenting the sensor configuration (act 411). For example, sensor 20A can present its sensor configuration (as digital data 6) to master unit 50 that presents the configuration to a user of display device 60. Thus, a user or technician can confirm the configuration is correct. When appropriate, the user or technician can then make any necessary changes to the configuration through the user-interface presented at display device 60. Intersection configurations can be displayed to a user or technician in an aerial view.

As depicted by reference label 412, the method 400 can be used to iteratively update sensor configurations. Thus, from time to time, when an iteration is appropriate, one or more of the acts of method 400 can be repeated.

Figure 10:
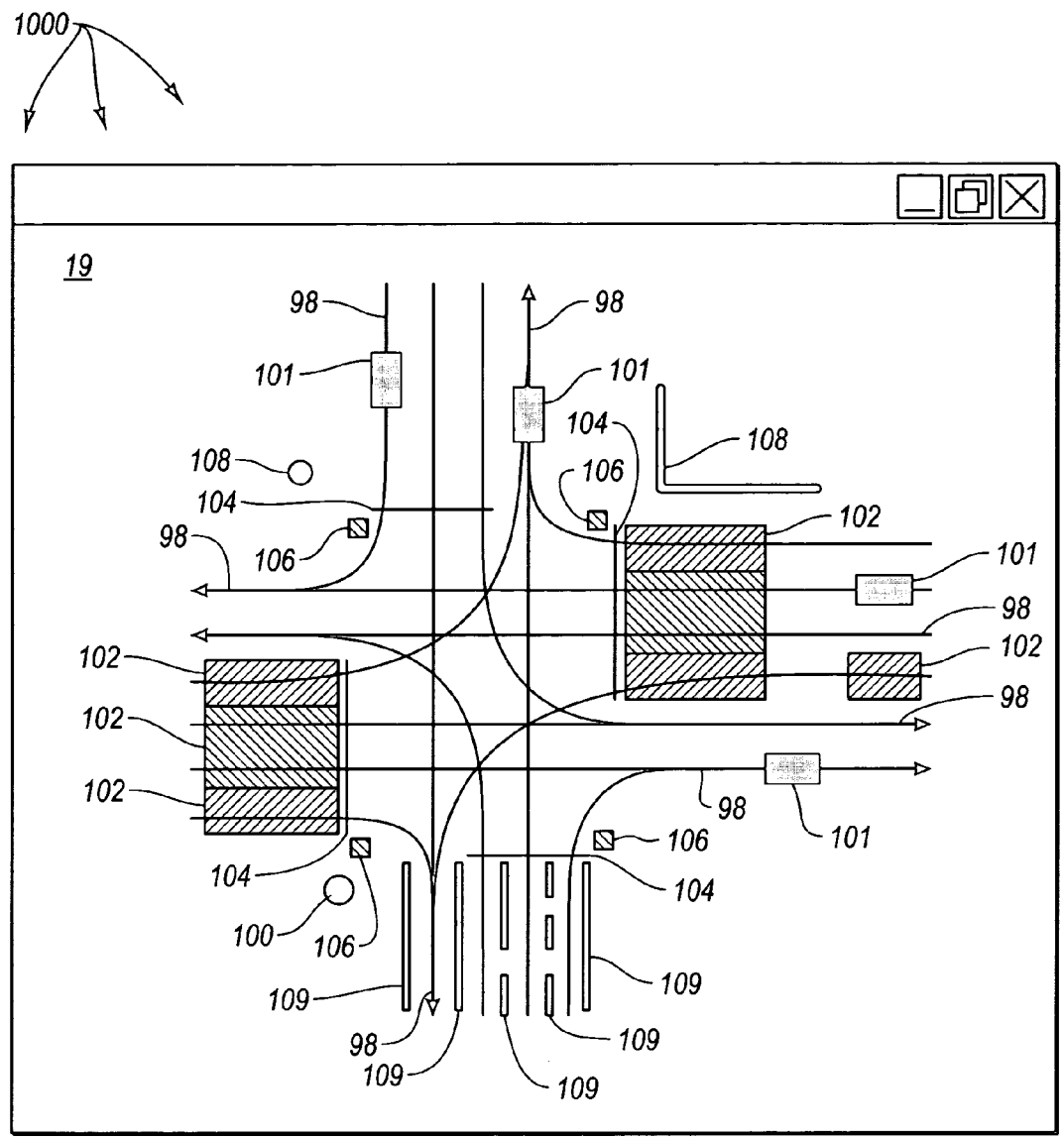
FIG. 10 is an example aerial intersection view.

FIG. 10 is an example aerial intersection view 1000. Sensor 20A can receive signals and signal reflections and can convert received signals and/or signal reflections into digital data 6A which can in turn be transmitted to master unit 50. Master unit 50 can convert digital data 6A into an aerial view (e.g., aerial view 1000) for display on a display device (e.g., display device 60).

In this specification and in the following claims "aerial view" is defined as a computerized display that displays sensor data with two or more spatial dimensions. Among other things, an aerial view, such as aerial view 1000 may display graphical representations of: sensor locations 100, vehicle detections 101, common vehicle paths 98, lane boundaries 109, stop bars 104, permanent stationary targets 108, vehicle detection zones 102, and pedestrian detection zones 106. As depicted in FIG. 10, the vehicle detection zones 102 are only shown in a few exemplary locations.

For simplicity, aerial view 1000 depicts lane boundaries 109 on one approach of the intersection. However, an aerial view can be configured such that lane boundaries 109 are shown on all approaches and are shown in different colors and styles depending on the type of boundary. For example, a lane boundary between two vehicle lanes with the same direction of travel is shown as a dashed white line while a boundary between two lanes with different directions of travel is shown as a double yellow line. Outside lane boundaries are shown as solid white lines. A traffic sensor technician can use the aerial view for verification of the sensor configuration.

In should be understood that sensor 20 or other similarly configured sensors, are capable of detecting pedestrian traffic as well as vehicular traffic. Signal characteristics used to distinguish a pedestrian from a vehicle are signal strength, speed of movement, and movement location relative to the intersection (e.g., at the side of the roads, at corners). The method described above for identifying common target paths encompasses identifying common pedestrian paths. From the common pedestrian paths and from the locations of curbs, the positions of sidewalks and crosswalks can be identified. Graphical representations of these features are added to the multi-dimensional electronic view of the intersection. Referring again briefly to FIG. 8, pedestrian detection zones 106, such as, for example, a corner where pedestrians wait for a signal change, can be configured using method 400 of FIG. 4.

Finding the Relative Location of Multiple Sensors

In some embodiments, if more than one traffic sensor is installed in the same area as part of the same intersection detection system (e.g., intersection detection system 200), the data from all sensors are used to create a single system configuration (e.g., system configuration 40). To facilitate system configuration without the need for user input, the sensors determine their position relative to other sensors in the same sensor system.

Figure 11:
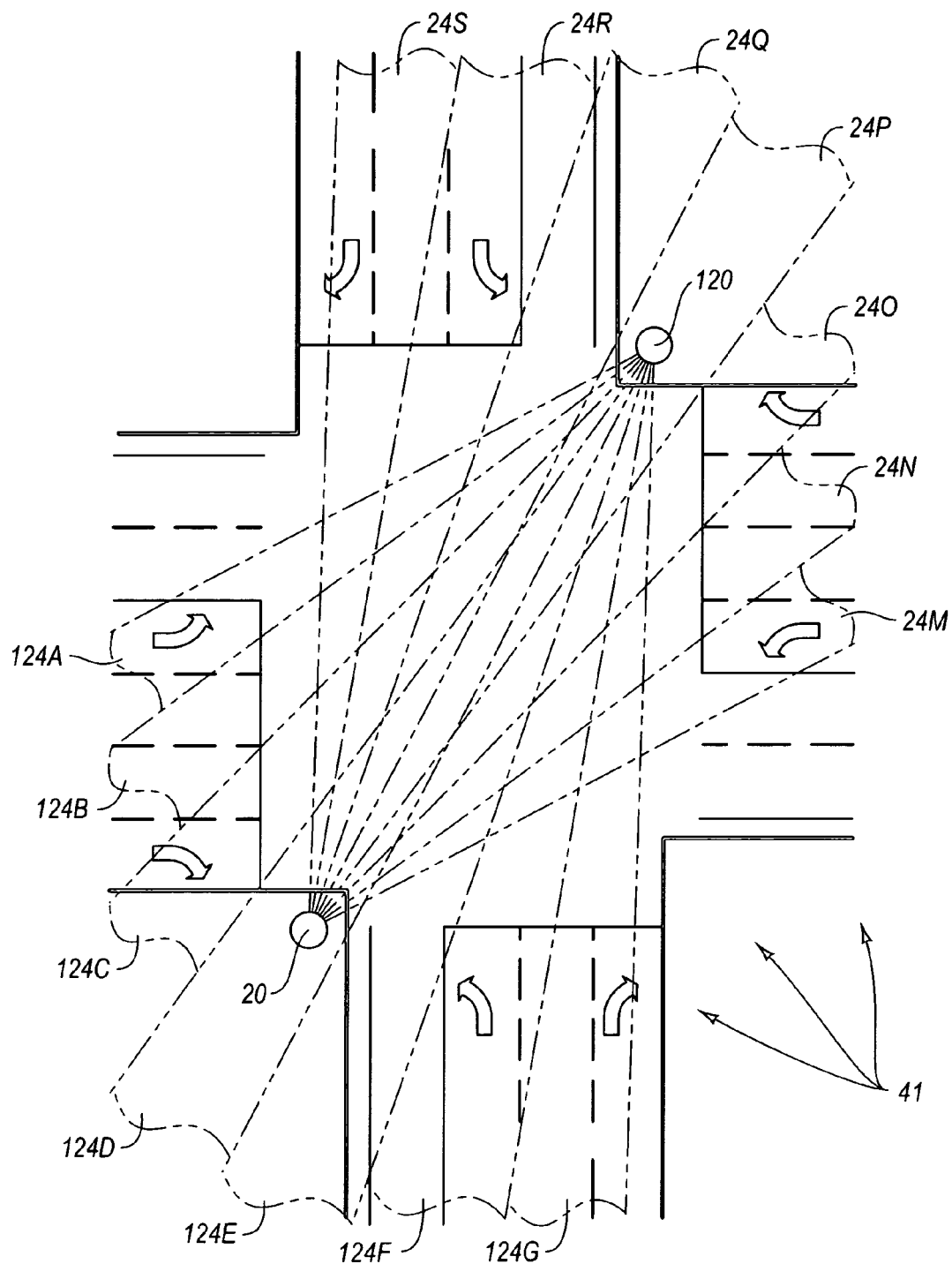
FIG. 11 illustrates multiple intersection vehicle traffic sensors of FIG. 1 is a roadway intersection and depicts portions of each sensor's aggregate sensor view.

FIG. 11 illustrates multiple intersection vehicle traffic sensors of FIG. 1 in intersection 41 and depicts portions of each sensor's aggregate sensor view. Although two sensors are depicted in FIG. 11, the methodology described is extended to systems with more than two sensors by repeatedly performing the relative location of two sensors until all sensors have been located. As depicted, intersection 41 includes sensors 20 and 120. For simplicity a reduced set of transducer views from each sensor are drawn, 24M, 24N, 24O, 24P, 24Q, 24R, 24S, 124A, 124B, 124C, 124D, 124E, 124F, 124G. Also for simplicity, vehicles 26A and 26B are not shown.

To measure the relative positioning of the sensors, the angle between the sensors is measured. That is, the transducer view of each sensor that includes the other sensor is determined. For example, sensor 20 can determine that transducer view 24P includes sensor 120. Likewise, sensor 120 can determine that transducer view 124D includes sensor 20. The distance between the two sensors can also be measured. Sensors 20 and 120 can be connected by a communication link such that sensors 20 and 120 can exchange data.

To determine the relative angling of the sensors, sensor 20 receives while sensor 120 transmits. The transmitting sensor 120 transmits a continuous wave signal from a single transducer view 124A while the receiving sensor 20 receives on each of its transducer views 24M, 24N, 24O, 24P, 24Q, 24R, 24S in sequence recording the power received in each one. The transmitting sensor 120 then changes to a different transducer view 124B and the receiving sensor again cycles through each of its transducer views 24M, 24N, 24O, 24P, 24Q, 24R, 24S. This continues until the transmitting sensor 120 has cycled through each of its transducer views 124A, 124B, 124C, 124D, 124E, 124F, 124G. From detected power levels of each combination of send and receive transducers views, a matrix of power levels for each transmit and receive antenna can be created.

FIG. 12 depicts an example transducer view power level matrix 1200. The peak in matrix 1200 indicates the transducer view for each of the sensors that points most directly at the other sensor. Accordingly, the relative angling of each of the sensors can be detected.

Figure 13:
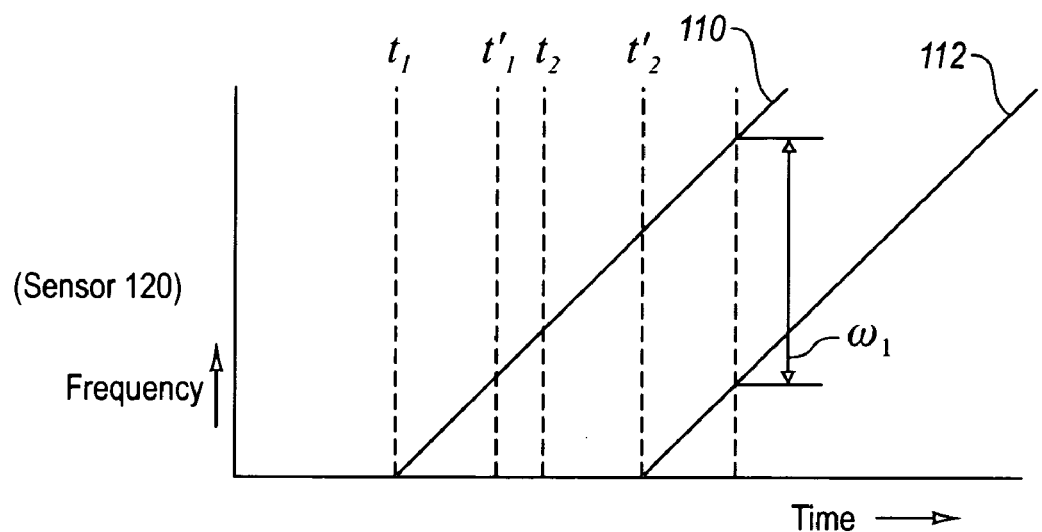
FIG. 13 illustrates a frequency modulated continuous wave timing diagram for a first sensor in a dual sensor traffic detection system.
Figure 14:
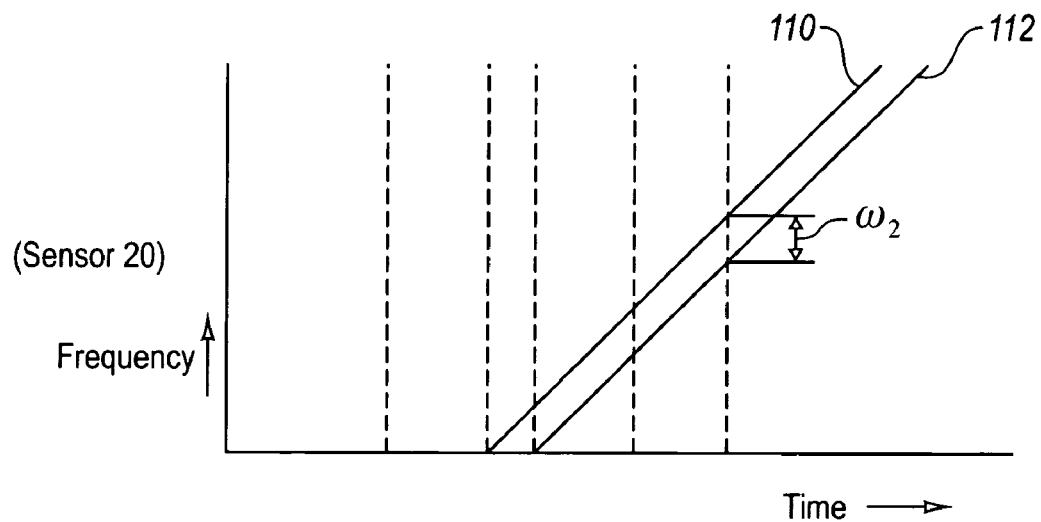
FIG. 14 illustrates a frequency modulated continuous wave timing diagram for a second sensor in the dual sensor traffic detection system.

In some embodiments, a frequency modulated continuous wave ("FMCW") system is used. When using an FMCW system, FMCW signals of each sensor can be synchronized with one another. FIG. 13 illustrates a frequency modulated continuous wave timing diagram for sensor 120 of the dual sensor traffic detection system of FIG. 11. FIG. 14 illustrates a frequency modulated continuous wave timing diagram for sensor 20 of the dual sensor traffic detection system of FIG. 11. The vertical axis in FIG. 13 and in FIG. 14 is frequency and the horizontal axis is time. The frequency slope and the time delays are for illustration purposes only and are not drawn to scale.

Synchronizing sensors 20 and 120 can include sensor 120 (the transmitting sensor) transmitting an FMCW signal 110 that begins at time $t_1$ using the appropriate transducer view 124D. If T is the repetition period of the FMCW signal then $t_1 = n \cdot T$ where n is an integer.

The receiving sensor 20 receives the transmitted FMCW signal 110 using the appropriate antenna beam 24P. The pulse arrives at sensor 20 at time $t'_1 = n \cdot T + T_d$ where $T_d$ is the time of flight delay from sensor 120 to sensor 20. Although sensor 20 is receiving only, it must generate an FMCW signal 112 with which it can demodulate received signals. Sensor 20 can have a mechanism for turning off transmission and still generating a signal for demodulation. However, in the depicted embodiment the sensor transmits the FMCW signal 112 with which it demodulates even though this transmission is undesirable. Thus, sensor 20 can employ an algorithm for distinguishing returns (reflections) from its own transmission and the signal received directly from sensor 120. This is possible because the demodulated signal received directly from sensor 120 changes frequency when the start time of the FMCW signal 112 is varied.

Sensor 20 demodulates using the internally generated FMCW signal 112 and monitors the demodulated signal. The frequency content of the demodulated signal is stored in memory. The start time of the FMCW signal 112 is adjusted by $$\frac{\omega_{max}}{m\dot{\omega}}$$

where the frequency slope of the FMCW signal is $\dot{\omega}$, the maximum receivable frequency of the baseband signal is $\omega_{max}$, and m is a constant greater than two. A second FMCW signal 112 is transmitted and demodulated and the frequency content of the received signal is compared to the frequency content of the previous FMCW signal 112. If the contents are similar then the transmission from sensor 120 has not yet been identified. If a strong frequency peak from the previous FMCW demodulation has moved by $$\frac{\omega_{max}}{m}$$

then this is likely the transmission from sensor 120. The maximum number of adjustments that may be necessary before the transmission from sensor 120 is received is $$\frac{mT\dot{\omega}}{\omega_{max}}.$$

This results in a reasonable number of adjustments when the system parameters are chosen appropriately.

Once the FMCW signal 112 is roughly synchronized to the FMCW signal 110 from sensor 120, sensor 20 continues to adjust the start time of its FMCW signal 112 until the demodulated baseband frequency of the FMCW signal 110, $\omega_2$, lies within a specified frequency range.

Note that the desired demodulated baseband frequency $\omega_2$ can be achieved if FMCW signal 112 is advanced with respect to FMCW signal 110 or if FMCW signal 112 is delayed with respect to FMCW signal 110. Thus, sensor 20 is configured to determine if its internally generated FMCW signal 112 is advanced or delayed. This determination can be accomplished by monitoring the change in frequency of the demodulated baseband signal with the change in the FMCW signal 112 start time. For example, if sensor 20 changes the start time of its FMCW signal 112 to a latter time, then the demodulated baseband signal decreases in frequency when the FMCW signal 110 from sensor 120 is delayed with respect to the FMCW signal 112 of sensor 20.

If the start time of the FMCW signal 112 is adjusted by $\Delta t$ then the demodulated baseband frequency of the direct transmission from one sensor to the other is changed by $\Delta \omega = \Delta t \cdot \dot{\omega}$. The slope of the FMCW signal, $\dot{\omega}$, is selected so that $\Delta \omega$ is sufficiently small for the $\Delta t$ that is used.

The demodulated baseband frequency of the FMCW signal 110 at sensor 20 is represented by $\omega_2$. Assuming the sensors have performed the procedure described above ensuring that the FMCW signal 112 is delayed with respect to the FMCW signal 110, the start time of the FMCW signal from sensor 20 is given by $$t_2 = n \cdot T + T_d + \frac{\omega_2}{\dot{\omega}}.$$

The transmitted FMCW signal from sensor 20 arrives at sensor 120 at time $$t'_2 = n \cdot T + 2T_d + \frac{\omega_2}{\dot{\omega}}.$$

Sensor 120 mixes the received FMCW signal 112 with the same FMCW signal it transmits 110 giving a tone at the frequency $\omega_1 = 2T_d \dot{\omega} + \omega_2$. The demodulated signal frequencies $\omega_1$ and $\omega_2$ are measured at sensor 120 and sensor 20 respectively and the time of flight delay, $T_d$, is calculated from these measurements.

After sensor 20 adjusts the start time of FMCW signal 112 so that $\omega_2$ is in the desired frequency range, it sends a message to sensor 120 indicating that it has locked on to its transmission. Once sensor 120 receives this message both sensors monitor the demodulated baseband frequency of the signal received from the other sensor. This is $\omega_2$ for sensor 20 and $\omega_1$ for sensor 120.

In order to achieve a more accurate measurement in the presence of reflections, the start time of the FMCW signal 112 from sensor 20 increases in sequence and both units continue to record and report the frequency of the demodulated baseband signal from the other unit for each FMCW signal 112 start time. After the values for $\omega_1$ and $\omega_2$ have been measured at both sensors for the entire sequence of start times, the values are communicated between the sensors or back to another processing unit where the calculation of $T_d$ is performed. $T_d$ can readily be converted into a distance measurement using the equation $D = c \cdot T_d$ where c is the speed of light and D is the distance between sensors.

Relative pointing angles and distances between sensors can be displayed in graphical form in the aerial view of the intersection. Further, the relative position data is used to synthesize the configuration data generated by each of the sensors into a single configuration that is presented to the user.

Alternate Single Transducer View Embodiment

Figure 15:
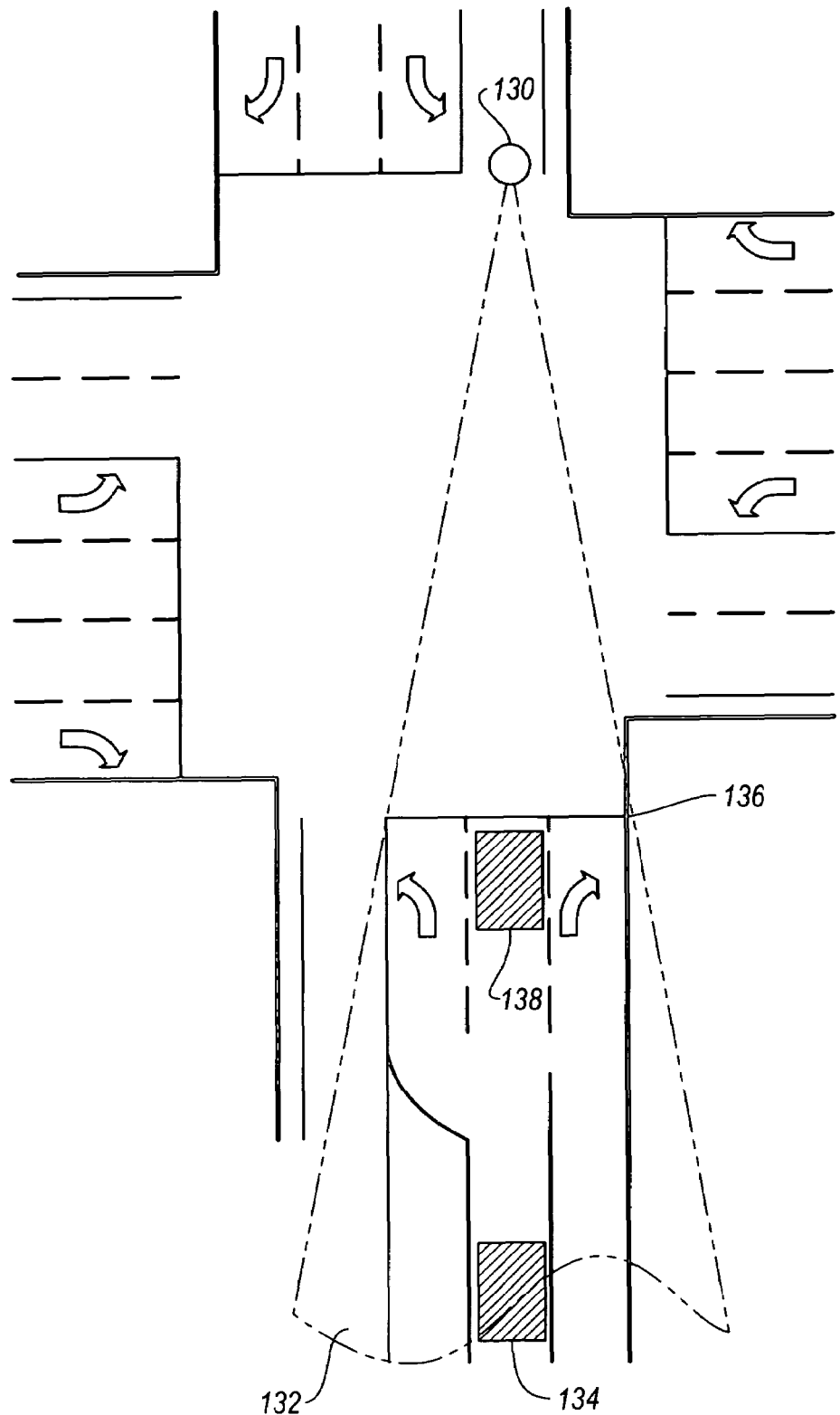
FIG. 15 illustrates an alternate embodiment of an intersection traffic sensor with a single transducer view.
Figure 7:
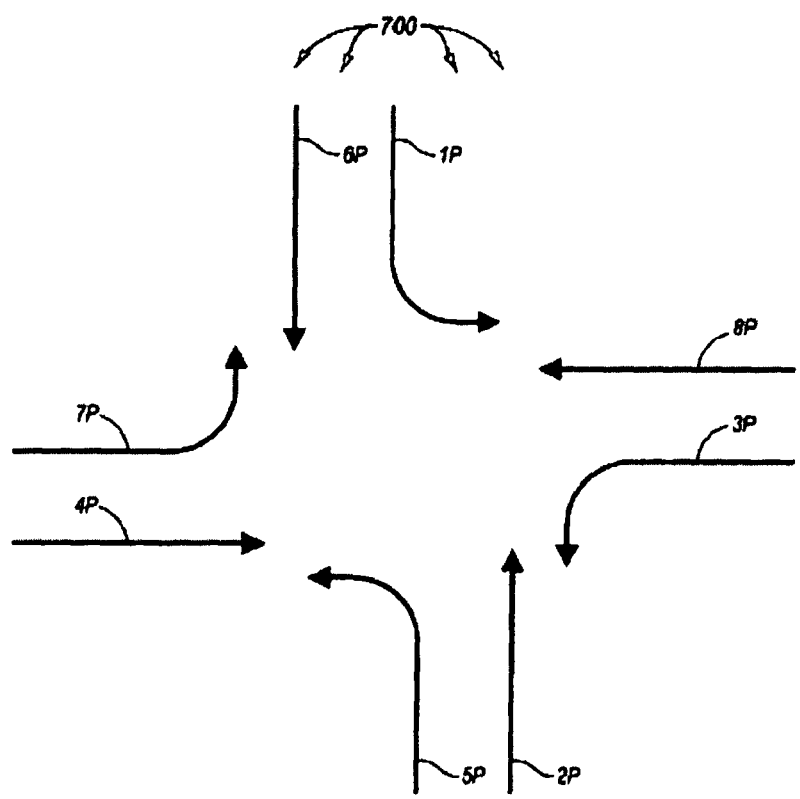

FIG. 15 illustrates an alternate embodiment of the invention. A sensor 130 with a single transducer view 132 is mounted such that the transducer view covers the stop bar 136 and the dilemma zone detection zone 134. Using the methods described in the scanning traffic sensor embodiment, the location of the stop bar 136, the location of the through traffic stop bar detection zone 138, and the location of the dilemma zone detection zone 134 are all determined. Track files are maintained as previously described with the distinction that in this embodiment the position information in the track files is one-dimensional (range only).

At the more distant ranges the transducer view 132 widens and may include traffic traveling in a direction opposite the traffic in the center of the transducer view. However, the direction of the traffic in the center of transducer view 132 can still be automatically determined since this traffic is observable at close ranges while the traffic traveling in the other lanes is not observable at close ranges. Thus, the direction of travel for the lane in the center of the transducer view 132, and the direction of travel for lanes to the side of the center of the transducer view 132, can be identified.

The track files indicate the location where vehicles come to a stop. This location is used to determine the location of stop bar 136. Furthermore, low pass filtering can be used to create a one-dimensional stopped vehicle histogram showing the locations of stopped vehicles. The one-dimensional stopped vehicle histogram in combination with the predetermined direction of traffic flow is used to detect the location of stop bar 136. As described previously, stop bar detection zone 138 is configured based on the location of the stop bar and dilemma zone detection zone 134 is configured based on the location of stop bar 136 and the average speed of traffic on the roadway.

Accordingly, embodiments of the present invention facilitate increasingly automatic configuration of detection zones. Thus, significantly reducing the time required to install and configure a traffic sensor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computerized system that includes at least one sensor for sensing targets in a roadway intersection, a method for creating a system configuration, the method comprising:
   an act of acquiring sensor data from one or more transducer views of the roadway intersection;
   an act of detecting at least one target within the one or more transducer views based on the acquired sensor data;
   an act of identifying a common target path from the at least one target; and
   an act of configuring a detection zone based on the identified common target path.

2. The method as recited in claim 1, wherein the act of acquiring sensor data from one or more transducer views comprises an act of acquiring sensor data from a plurality of transducer views.

3. The method as recited in claim 1, wherein the act of acquiring sensor data from one or more transducer views comprises an act of acquiring sensor data from a plurality of different sensors.

4. The method as recited in claim 3, wherein the act of configuring a location of a detection zone comprises an act of finding the relative location of the plurality of different sensors.

5. The method as recited in claim 1, wherein the act of acquiring sensor data from one or more transducer views comprises an act of transmitting a Frequency Modulated Continuous Wave radar signal.

6. The method as recited in claim 1, wherein the act of acquiring sensor data from one or more transducer views comprises an act of transmitting a transmit signal that includes one or more of an acoustic transmit signal, a laser transmit signal, and an infrared transmit signal.

7. The method as recited in claim 1, wherein the act of acquiring sensor data from one or more transducer views comprises an act of transmitting a radar signal.

8. The method as recited in claim 1, wherein the act of acquiring sensor data from one or more transducer views comprises an act of determining the range to one or more targets within the one or more transducer views.

9. The method as recited in claim 1, wherein the act of acquiring sensor data from one or more transducer views comprises an act of transmitting a pulse compression radar signal.

10. The method as recited in claim 1, wherein the act of detecting at least one target within the one or more transducer views comprises an act of detecting at least one non-stationary target within the one or more transducer views.

11. The method as recited in claim 1, wherein the act of identifying a common target path from at least one the at least one target comprises:
    an act of creating a track file from a target detection; and
    an act of updating the track file from a plurality of subsequent target detections.

12. The method as recited in claim 1, wherein the act of identifying a common target path from the at least one target comprises an act of creating a two-dimensional histogram of target detections.

13. The method as recited in claim 1, wherein the act of configuring a detection zone comprises an act of configuring a vehicular detection zone.

14. The method as recited in claim 1, wherein the act of configuring a detection zone comprises an act of configuring a pedestrian detection zone.

15. The method as recited in claim 1, further comprising an act of generating digital data from one or more target detections and the system configuration.

16. The method as recited in claim 15, wherein the act of generating digital data comprises an act of generating an aerial view.

17. The method as recited in claim 15, wherein the act of generating digital data comprises an act of generating traffic statistics.

18. The method as recited in claim 1, wherein the roadway intersection is a roadway intersection with at least one traffic signal phase, and wherein the act of configuring a detection zone based on the identified common target path comprises an act of configuring a detection zone based on the identified common target path and the at least one traffic signal phase, the method further comprising:
    an act of monitoring the at least one traffic signal phase.

19. The method as recited in claim 1, wherein the act of configuring a detection zone comprises an act of configuring the detection zone based on a traffic governing agency's guidelines.

20. At a computerized system that includes at least one sensor for sensing targets in a roadway intersection, a method for creating a system configuration, the method comprising:
    an act of acquiring sensor data from one or more transducer views of the roadway intersection;
    an act of detecting at least one stationary target within the one or more transducer views based on the acquired sensor data;
    an act of identifying at least one common target position from the at least one stationary target; and
    an act of configuring a detection zone based on the common target position.

21. The method as recited in claim 20, wherein the act of acquiring sensor data from one or more transducer views comprises an act of acquiring sensor data from a plurality of transducer views.

22. The method as recited in claim 20, wherein the act of acquiring sensor data from one or more transducer views comprises an act of transmitting a Frequency Modulated Continuous Wave radar signal.

23. The method as recited in claim 20, wherein the act of acquiring sensor data from one or more transducer views comprises an act of transmitting a transmit signal that includes one or more of an acoustic transmit signal, a laser transmit signal, and an infrared transmit signal.

24. The method as recited in claim 20, wherein the act of acquiring sensor data from one or more transducer views comprises an act of a transmitting a radar signal.

25. The method as recited in claim 20, wherein the act of acquiring sensor data from one or more transducer views comprises an act of transmitting a pulse compression radar signal.

26. The method as recited in claim 20, wherein the act of acquiring sensor data from one or more transducer views comprises an act of determining the range to one or more targets within the one or more transducer views.

27. The method as recited in claim 20, wherein the act of detecting at least one stationary target within the one or more transducer views comprises an act of detecting one or more stationary targets selected from among a stationary vehicle, a stationary pedestrian, a traffic signal pole, and a sensor.

28. The method as recited in claim 20, wherein the act of identifying at least one common target position comprises an act of identifying at least one common stationary target position.

29. The method as recited in claim 20, wherein the act of configuring a detection zone comprises an act of repeatedly detecting a stationary target using the sensor data.

30. The method as recited in claim 20, wherein the act of configuring a detection zone comprises an act of configuring the detection zone based on a traffic governing agency's guidelines.

31. At a computerized system that includes at least one sensor with at least one detection zone for sensing vehicles in a roadway intersection with multiple traffic signal phases a method for creating a system configuration, the method comprising:
  an act of acquiring sensor data from one or more transducer views of the roadway intersection;
  an act of detecting targets within the one or more transducer views based on the acquired sensor data;
  an act of identifying a common target path from at least one detected non-stationary target;
  an act of detecting stationary targets within the one or more transducer views based on the acquired sensor data;
  an act of identifying a common target position from at least one stationary target;
  a step for creating a sensor configuration from the common target paths and common target positions; and
  an act of configuring a detection zone from the at least one common target position.

32. A method as recited in claim 31, wherein the step for creating a sensor configuration from the common target paths and common target positions comprises:
  a corresponding act of configuring detection zones for intersection actuation;
  a corresponding act of associating configured detection zones with traffic signal phases;
  a corresponding act of finding locations of lane boundaries for traffic lanes corresponding to the roadway intersection; and
  a corresponding act of finding locations of permanent stationary targets associated with the roadway intersection.

33. A computer program product for use at a computerized system that includes at least one sensor for sensing targets in a roadway intersection, the computer program product for implementing a method for creating a system configuration, the computer program product comprising one or more computer-readable media having stored thereon computer-executable instructions that, when executed by one or more processors of the computerized system, cause the computerized system to perform the following:
  acquire sensor data from one or more transducer views of the roadway intersection;
  detect at least one target within the one or more transducer views based on the acquired sensor data;
  identify a common target path from the at least one target; and
  configure a detection zone from the common target path.

34. The computer program product as recited in claim 33, further comprising computer-executable instructions that, when executed by a processor, cause the computerized system to perform the following:
  configure detection zones for intersection actuation;
  associate configured detection zones with traffic signal phases;
  find locations of lane boundaries for traffic lanes corresponding to the roadway intersection; and
  find locations of permanent stationary targets associated with the roadway intersection.

35. The computer program product as recited in claim 33, wherein computer-executable instructions that, when executed, cause the computerized system to acquire sensor data from one or more transducer views comprise computer-executable instructions that, when executed, cause the computerized system to transmit a pulse compression radar signal.

36. The computer program product as recited in claim 33, wherein computer-executable instructions that, when executed, cause the computerized system to detect targets within the one or more transducer views comprise computer-executable instructions that, when executed, cause the computerized system to detect a non-stationary target within the one or more transducer views.

37. The computer program product as recited in claim 33, wherein computer-executable instructions that, when executed, cause the computerized system to identify a target path for the detected target comprise computer-executable instructions that, when executed, cause the computerized system to:
  create a track file from a target detection; and
  update the track file from a plurality of subsequent target detections.

38. The computer program product as recited in claim 33, wherein computer-executable instructions that, when executed, cause the computerized system to identify a target path for the detected target comprise computer-executable instructions that, when executed, cause the computerized system to create a two-dimensional histogram of target detections.

39. The computer program product as recited in claim 33, wherein computer-executable instructions that, when executed, cause the computerized system to configure a detection zone comprise computer-executable instructions that, when executed, cause the computerized system to configure a vehicular detection zone.

40. The computer program product as recited in claim 33, wherein computer-executable instructions that, when executed, cause the computerized system to configure a detection zone comprise computer-executable instructions that, when executed, cause the computerized system to configure a pedestrian detection zone.

41. The computer program product as recited in claim 33, wherein computer-executable instructions that, when executed, cause the computerized system to configure a detection zone comprise computer-executable instructions that, when executed, cause the computerized system to configure a detection zone based on a traffic governing agency's guidelines.

42. The computer program product as recited in claim 33, further comprising:
computer-executable instructions that, when executed, cause the computerized system to generate digital data from one or more target detections and a system configuration for purposes of creating an aerial view of the roadway intersection.

43. A computer program product for use at a computerized system that includes at least one sensor for sensing targets in a roadway intersection, the computer program product for implementing a method for creating a system configuration, the computer program product comprising one or more computer-readable media having stored thereon computer-executable instructions that, when executed by one or more processors of the computerize system, cause the computerized system to perform the following:
acquire sensor data from one or more transducer views of the roadway intersection;
detect at least one stationary target within the one or more transducer views in the acquired sensor data;
identify at least one common target position from the at least one stationary target; and
configure a detection zone from the at least one common target position.

44. The computer program product as recited in claim 43, further comprising computer-executable instructions that, when executed by a processor, cause the computerized system to perform the following:
configure detection zones for intersection actuation;
associate configured detection zones with traffic signal phases;
find locations of lane boundaries for traffic lanes corresponding to the roadway intersection; and
find locations of permanent stationary targets associated with the roadway intersection.

45. The computer program product as recited in claim 43, wherein computer-executable instructions that, when executed, cause the computerized system to acquire sensor data from one or more transducer views comprise computer-executable instructions that, when executed, cause the computerized system to transmit a pulse compression radar signal.

46. The computer program product as recited in claim 43, wherein computer-executable instructions that, when executed, cause the computerized system to detect stationary targets within the one or more transducer views comprise computer-executable instructions that, when executed, cause the computerized system to detect a plurality of reflections from a plurality of transmitted signals.

47. The computer program product as recited in claim 43, wherein computer-executable instructions that, when executed, cause the computerized system to detect stationary targets within the one or more transducer views comprise computer-executable instructions that, when executed, cause the computerized system to detect one or more stationary targets selected from among a stationary vehicle, a stationary pedestrian, a traffic signal pole, and a sensor.

48. The computer program product as recited in claim 43, wherein computer-executable instructions that, when executed, cause the computerized system to detect stationary targets within the one or more transducer views comprise computer-executable instructions that, when executed, cause the computerized system to repeatedly detect a stationary target using the sensor data.

49. The computer program product as recited in claim 33, wherein computer-executable instructions that, when executed, cause the computerized system to configure a detection zone comprise computer-executable instructions that, when executed, cause the computerized system to configure a detection zone based on a traffic governing agency's guidelines.

50. At a computerized traffic detection system that includes at least one sensor for sensing targets in a roadway intersection controlled by a traffic controller with at least one traffic signal phase, a method for configuring the roadway intersection, the method comprising:
an act of receiving detection indicators from a configured detection zone;
an act of monitoring the at least one traffic signal phase;
an act of creating an association of the configured detection zone with a traffic controller input based on the at least one signal phase and the detection indicators; and
an act of configuring the computerized traffic detection system to communicate a detection in the configured detection zone to the traffic controller on the associated traffic controller input.

51. The method as recited in claim 50, wherein the act of creating an association of the configured detection zone with a traffic controller input comprises an act of creating an association of the configured detection zone with a traffic controller input base on a traffic governing agency's guidelines.

52. The method as recited in claim 50, wherein the act of configuring the computerized traffic detection system to communicate a detection in the configured detection zone to the traffic controller on the associated traffic controller input consists of the computerized traffic detection system causing a contact closure card to create a contact closure on the associated traffic controller input.

* * * * *

UNITED STATES PATENT AND TRADEMARK OFFICE
CERTIFICATE OF CORRECTION

PATENT NO. : 7,573,400 B2  Page 1 of 4
APPLICATION NO. : 11/264339
DATED : August 11, 2009
INVENTOR(S) : Arnold et al.

It is certified that error appears in the above-identified patent and that said Letters Patent is hereby corrected as shown below:

Title Page
Item 56, References Cited, Other Publications, Page 2, Column 2, change "Adaptive Lane Finding in Road Traffic Image Analysis B.D. Stweart, I. Reading, M.S. Thomson, T.D. Binnie, K W. Dickenson, C.L. Wan Napier University, Edinburgh, UK Road Traffic Monitoring and Control, Apr. 26-28, 1994 Conference Publication No. 391, IEE, 1994 pp. 133-136." to --Adaptive Lane Finding in Road Traffic Image Analysis B.D. Stweart, I. Reading, M.S. Thomson, T.D. Binnie, K.W. Dickenson, C.L. Wan Napier University, Edinburgh, UK Road Traffic Monitoring and Control, 26-28, Apr. 1994 Conference Publication No. 391, IEE, 1994 pp. 133-136.--

Drawings
Sheet 7, replace FIG. 7 with the Figure depicted below, wherein an example of traffic signal phase numbering is labeled 700

Signed and Sealed this

Twenty-second Day of June, 2010

David J. Kappos
*Director of the United States Patent and Trademark Office*

Column 1
Line 33, add --,-- after "thoroughfares"
Line 44, add --,-- after "arise"
Line 45, add --,-- after "part"

Column 4
Line 31, add --12-- after "transceiver"

Column 5
Line 1, change "configuration for example" to --configuration, for example,--
Line 40, add --,-- after "embodiments"

Column 6
Line 60, change "noise based" to --noise-based--
Line 65, change "noise based" to --noise-based--

Column 8
Line 25, change "FIG. 2" to --FIG. 3--
Line 37, change "FIG. 2" to --FIG. 3--
Line 63, change "tack" to --track--

Column 9
Line 29, change "noise based" to --noise-based--
Line 56, change "cross walks" to --crosswalks--

Column 12
Line 17, add --,-- after "embodiments"
Line 22, add --,-- after "FIG. 5"
Line 55, change "310" to --410--

Column 13
Line 36, add --,-- after "red"

Column 14
Line 40, remove [and the second portion of 48B]
Line 44, remove [locations of] before "locations of"
Line 57, add --.-- after "buildings"
Line 58, add --,-- after "embodiments"

Column 15
Line 5, change "data 6) to master unit 50" to --data 6A) to master unit 51--
Line 20, change "50" to --51--
Line 21, change "50" to --51--
Line 45, change "20" to --20A--

CERTIFICATE OF CORRECTION (continued)
U.S. Pat. No. 7,573,400 B2

Column 17
Line 3, add --,-- after "demodulates"
Line 61, change "latter" to --later--

Column 18
Line 25, add --,-- after "20"
Line 26, add --,-- after "respectively"

Column 19
Line 14, add --,-- after "histogram"
Line 15, add --,-- after "flow"
Line 17, add --136-- after "bar"

Column 20
Line 18, remove [at least one] after "from"

Column 22
Line 60, add --and-- after "target"
Line 67, add --and-- after "zone"

Column 23
Line 6, add --and-- after "zone"
Line 12, add --and-- after "zone"
Line 54, add --and-- after "views"

Column 24
Line 11, add --and-- after "views"
Line 19, add --and-- after "views"
Line 26, add --and-- after "zone"